United States Patent
Liu et al.

(10) Patent No.: US 12,376,132 B2
(45) Date of Patent: Jul. 29, 2025

(54) DOWNLINK SHARED CHANNEL CONFIGURATION FOR MULTICAST

(71) Applicant: QUALCOMM Incorporated, San Diego, CA (US)

(72) Inventors: Le Liu, Fremont, CA (US); Alberto Rico Alvarino, San Diego, CA (US); Kazuki Takeda, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 17/377,030

(22) Filed: Jul. 15, 2021

(65) Prior Publication Data
US 2022/0022162 A1 Jan. 20, 2022

Related U.S. Application Data

(60) Provisional application No. 63/054,088, filed on Jul. 20, 2020.

(51) Int. Cl.
*H04W 72/30* (2023.01)

(52) U.S. Cl.
CPC .................................. *H04W 72/30* (2023.01)

(58) Field of Classification Search
CPC ... H04W 72/30; H04W 72/121; H04W 72/23; H04W 4/50; H04W 4/06
See application file for complete search history.

(56) References Cited

U.S. PATENT DOCUMENTS

| | | | |
|---|---|---|---|
| 11,382,011 B2 * | 7/2022 | Shih | H04W 48/20 |
| 2019/0149365 A1 * | 5/2019 | Chatterjee | H04L 25/0226 |
| | | | 370/329 |

(Continued)

FOREIGN PATENT DOCUMENTS

| | | | | |
|---|---|---|---|---|
| EP | 3148270 A1 * | 3/2017 | | |
| EP | 3668127 A1 * | 6/2020 | | H04L 5/0092 |

(Continued)

OTHER PUBLICATIONS

WO 2021/057829 Hu et al. (Year: 2021).*

(Continued)

*Primary Examiner* — Ivan O Latorre
(74) *Attorney, Agent, or Firm* — Holland & Hart LLP

(57) ABSTRACT

Methods, systems, and devices for wireless communications are described. A user equipment (UE) may determine a group-specific multicast/broadcast communication configuration. The group-specific multicast/broadcast communication configuration may be independently configured from a unicast communication configuration and a cell-specific communication configuration. The UE may determine one or more multicast/broadcast communication parameters according to the group-specific multicast/broadcast communication configuration. The communication parameters may include a time resource allocation, a frequency resource allocation, a slot configuration, a downlink reference signal configuration and a resource mapping configuration for receiving multicast/broadcast downlink signals. The UE may receive multicast/broadcast downlink signals from the base station based on the one or more multicast/broadcast communication parameters.

38 Claims, 16 Drawing Sheets

(56) References Cited

U.S. PATENT DOCUMENTS

| | | | |
|---|---|---|---|
| 2019/0159213 A1 | 5/2019 | Baldemair et al. | |
| 2020/0059760 A1 | 2/2020 | Li et al. | |
| 2022/0022146 A1* | 1/2022 | Sengupta | H04B 7/18519 |
| 2023/0056055 A1* | 2/2023 | Zhang | H04W 56/001 |
| 2023/0114940 A1* | 4/2023 | Li | H04L 5/0053 |
| | | | 370/329 |

FOREIGN PATENT DOCUMENTS

| | | | | |
|---|---|---|---|---|
| RU | 2704535 C1 * | 10/2019 | | H04W 68/005 |
| WO | WO-2019201459 A1 * | 10/2019 | | H04L 1/1819 |
| WO | WO-2021035751 A1 * | 3/2021 | | |

OTHER PUBLICATIONS

Huawei, et al., "Group-RNTI for SC-PTM", 3GPP Draft, 3GPP TSG-RAN WG2 Meeting #89bis, R2-151442, Group-RNTI for SC-PTM, 3rd Generation Partnership Project (3GPP), Mobile Competence Centre, 650, Route Des Lucioles, F-06921 Sophia-Antipolis Cedex, France, vol. RAN WG2, No. Bratislava, Slovakia, Apr. 20, 2015-Apr. 24, 2015, Apr. 11, 2015 (Apr. 11, 2015), XP050953313, 2 Pages, Retrieved from the Internet: URL: http://www.3gpp.org/ftp/tsg_ran/WG2_RL2/TSGR2_89bis/Docs/. [retrieved on Apr. 11, 2015] paragraph [0002].

International Search Report and Written Opinion—PCT/US2021/042023—ISA/EPO—Nov. 29, 2021 (206077WO).

Qualcomm Incorporated: "Remaining Issues on BWP", 3GPP TSG RAN WG1 Meeting #93, 3GPP Draft; R1-1807368, Remaining Issues on BWP, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 12, 2018 (May 12, 2018), pp. 1-19, XP051463060, Retrieved from the Internet: URL: https://www.3gpp.org/ftp/tsg_ran/WG1_RL1/TSGR1_93/Docs, [retrieved on May 12, 2018], paragraph [0002].

* cited by examiner

DOWNLINK SHARED CHANNEL CONFIGURATION FOR MULTICAST

CROSS REFERENCE

The present Application for Patent claims the benefit of U.S. Provisional Patent Application No. 63/054,088 by Liu et al., entitled "DOWNLINK SHARED CHANNEL CONFIGURATION FOR MULTICAST," filed Jul. 20, 2020, assigned to the assignee hereof, and expressly incorporated by reference herein.

FIELD OF TECHNOLOGY

The following relates to wireless communications, including downlink shared channel configuration for multicast.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may use a UE-specific configuration for configurating a UE to receive broadcast or multicast data transmissions. However, in some examples, a base station may transmit multicast data to a group of UEs in the same cell or different cells. In such cases, a cell-specific configuration or a UE-specific configuration for receiving the multicast data may result in loss of data or inefficient communications between the base station and the group of UEs.

SUMMARY

The described techniques relate to improved methods, systems, devices, and apparatuses that support downlink shared channel configuration for multicast/broadcast. Generally, the described techniques provide for a user equipment (UE) receiving a group-specific multicast configuration and determining one or more multicast communication parameters such that the UE may receive multicast transmissions from a base station. In some examples, multicast may refer to multicast, broadcast, or multicast/broadcast, and the described techniques may apply to multicast, broadcast, or both (e.g., multicast/broadcast). In some cases, the UE may receive a group-specific multicast/broadcast communication configuration from a base station. The group-specific multicast/broadcast communication configuration may be independently configured from a unicast communication configuration. The UE may determine one or more multicast/broadcast communication parameters according to the group-specific multicast/broadcast communication configuration. The communication parameters may include one or more of a time resource allocation, a frequency resource allocation, a slot configuration, a downlink reference signal configuration and a resource mapping configuration for receiving multicast/broadcast downlink signals. The UE may receive multicast/broadcast downlink signals from the base station based on the one or more multicast communication parameters.

A method of wireless communications at a UE is described. The method may include identifying a group-specific multicast/broadcast communication configuration for receiving one or more multicast downlink signals, where the group-specific multicast/broadcast communication configuration may be independently configured from a unicast communication configuration, and a cell-specific communication configuration, determining a set of multicast/broadcast communication parameters based on the group-specific multicast/broadcast communication configuration, the set of multicast/broadcast communication parameters including a time resource allocation, a frequency resource allocation, a slot configuration, a downlink reference signal configuration, and a resource mapping configuration for receiving the one or more multicast/broadcast downlink signals, and receiving the one or more multicast/broadcast downlink signals based on the set of multicast/broadcast communication parameters including the time resource allocation, the frequency resource allocation, the slot configuration, the downlink reference signal configuration, and the resource mapping configuration.

An apparatus for wireless communications at a UE is described. The apparatus may include a processor, memory coupled with the processor, and instructions stored in the memory. The instructions may be executable by the processor to cause the apparatus to identify a group-specific multicast/broadcast communication configuration for receiving one or more multicast/broadcast downlink signals, where the group-specific multicast/broadcast communication configuration may be independently configured from a unicast communication configuration and a cell-specific communication configuration, determine a set of multicast/broadcast communication parameters based on the group-specific multicast/broadcast communication configuration, the set of multicast/broadcast communication parameters including a time resource allocation, a frequency resource allocation, a slot configuration, a downlink reference signal configuration, and a resource mapping configuration for receiving the one or more multicast/broadcast downlink signals, and receive the one or more multicast/broadcast downlink signals based on the set of multicast/broadcast communication parameters including the time resource allocation, the frequency resource allocation, the slot configuration, the downlink reference signal configuration, and the resource mapping configuration.

Another apparatus for wireless communications at a UE is described. The apparatus may include means for identifying a group-specific multicast/broadcast communication configuration for receiving one or more multicast downlink signals, where the group-specific multicast/broadcast communication configuration may be independently configured from a unicast communication configuration and a cell-specific communication configuration, determining a set of multicast/broadcast communication parameters based on the group-specific multicast/broadcast communication configuration, the set of multicast/broadcast communication parameters including a time resource allocation, a frequency resource allocation, a slot configuration, a downlink reference signal configuration, and a resource mapping configuration for receiving the one or more multicast/broadcast downlink signals, and receiving the one or more multicast/broadcast downlink signals based on the set of multicast/broadcast communication parameters including the time resource allocation, the frequency resource allocation, the slot configuration, the downlink reference signal configuration, and the resource mapping configuration.

A non-transitory computer-readable medium storing code for wireless communications at a UE is described. The code may include instructions executable by a processor to identify a group-specific multicast/broadcast communication configuration for receiving one or more multicast/broadcast downlink signals, where the group-specific multicast/broadcast communication configuration may be independently configured from a unicast communication configuration and a cell-specific communication configuration, determine a set of multicast/broadcast communication parameters based on the group-specific multicast/broadcast communication configuration, the set of multicast/broadcast communication parameters including a time resource allocation, a frequency resource allocation, a slot configuration, a downlink reference signal configuration, and a resource mapping configuration for receiving the one or more multicast/broadcast downlink signals, and receive the one or more multicast/broadcast downlink signals based on the set of multicast communication parameters including the time resource allocation, the frequency resource allocation, the slot configuration, the downlink reference signal configuration, and the resource mapping configuration.

Some examples of the method, apparatuses, and non-transitory computer-readable medium described herein may further include operations, features, means, or instructions for receiving the group-specific multicast/broadcast communication configuration encoded with a group radio network temporary identifier (RNTI) (G-RNTI), where different G-RNTIs correspond to different group-specific communication configurations.

In some examples of the method, apparatuses, and non-transitory computer-readable medium described herein, determining the set of multicast communication parameters may include operations, features, means, or instructions for identifying that a parameter of the set of multicast/broadcast communication parameters may be not explicitly identified in the group-specific multicast/broadcast communication configuration, and determining a default value for the parameter.

In some examples of the method, apparatuses, and non-transitory computer-readable medium described herein, determining the default value may include operations, features, means, or instructions for identifying that the default value may be a corresponding cell-specific value from the cell-specific communication configuration.

In some examples of the method, apparatuses, and non-transitory computer-readable medium described herein, determining the default value may include operations, features, means, or instructions for identifying that the default value may be a corresponding UE-specific value from a UE-specific multicast/broadcast communication configuration.

In some examples of the method, apparatuses, and non-transitory computer-readable medium described herein, determining the default value may include operations, features, means, or instructions for identifying that the default value may be predefined.

Some examples of the method, apparatuses, and non-transitory computer-readable medium described herein may further include operations, features, means, or instructions for receiving the group-specific multicast/broadcast communication configuration encoded with a G-RNTI corresponding to a broadcast traffic channel, where the set of multicast/broadcast communication parameters corresponding to the group-specific multicast/broadcast communication configuration and the G-RNTI may be different from parameters associated with a multicast/broadcast RNTI (MB-RNTI) corresponding to a multicast/broadcast control channel (MBCCH).

In some examples of the method, apparatuses, and non-transitory computer-readable medium described herein, determining the set of multicast/broadcast communication parameters further may include operations, features, means, or instructions for determining the time resource allocation via radio resource control (RRC) signaling that indicates a G-RNTI, where the G-RNTI may be indicated in a time resource allocation table, the time resource allocation table including a set of rows, where each row of the set of rows may correspond to at least one of a slot offset value, a start and length indicator value (SLIV), and a physical downlink shared channel (PDSCH) mapping type.

Some examples of the method, apparatuses, and non-transitory computer-readable medium described herein may further include operations, features, means, or instructions for determining that a default slot offset value may be used, where the default slot offset value may be either 0 or greater than 0.

In some examples of the method, apparatuses, and non-transitory computer-readable medium described herein, determining the set of multicast/broadcast communication parameters further may include operations, features, means, or instructions for determining that one or more default values of the time resource allocation may be used, determining that a G-RNTI transmission in a common search space may be configured, receiving a downlink control information (DCI) signal indicating a subset of rows of a cell-specific allocation table, and identifying the one or more default values of the time resource allocation from the subset of rows of the cell-specific allocation table based on the G-RNTI transmission being configured in the common search space.

In some examples of the method, apparatuses, and non-transitory computer-readable medium described herein, determining the set of multicast/broadcast communication parameters further may include operations, features, means, or instructions for determining that one or more default values of the time resource allocation may be used, determining that a G-RNTI transmission in a UE-specific search space may be configured, receiving a DCI signal indicating a subset of rows of a UE-specific allocation table, and identifying the one or more default values of the time resource allocation from the subset of rows of the UE-specific allocation table based on the G-RNTI transmission being configured in the UE-specific search space.

In some examples of the method, apparatuses, and non-transitory computer-readable medium described herein, determining the set of multicast/broadcast communication parameters further may include operations, features, means, or instructions for determining that one or more default values of the time resource allocation may be used, and identifying the one or more default values from a default time resource allocation table.

In some examples of the method, apparatuses, and non-transitory computer-readable medium described herein, determining the set of multicast/broadcast communication parameters further may include operations, features, means, or instructions for determining the frequency resource allocation via RRC signaling that indicates a group-specific frequency resource allocation type and a group-specific resource block group size.

In some examples of the method, apparatuses, and non-transitory computer-readable medium described herein, determining the set of multicast/broadcast communication parameters further may include operations, features, means, or instructions for determining that one or more default values of the frequency resource allocation may be used, and identifying a default frequency resource allocation type as one of the one or more default values, the default frequency resource allocation type being based on a format of DCI received by the UE.

In some examples of the method, apparatuses, and non-transitory computer-readable medium described herein, determining the set of multicast/broadcast communication parameters further may include operations, features, means, or instructions for determining that one or more default values of the frequency resource allocation may be used, and identifying a default resource block group size as one of the one or more default values, the default resource block group size being based on a G-RNTI.

In some examples of the method, apparatuses, and non-transitory computer-readable medium described herein, determining the set of multicast/broadcast communication parameters further may include operations, features, means, or instructions for determining the slot configuration via a multicast-specific slot configuration.

In some examples of the method, apparatuses, and non-transitory computer-readable medium described herein, determining the set of multicast/broadcast communication parameters further may include operations, features, means, or instructions for determining that a default slot configuration may be used, and determining the default slot configuration based on a common time division duplex uplink-downlink configuration and not based on a dedicated time division duplex uplink-downlink configuration.

In some examples of the method, apparatuses, and non-transitory computer-readable medium described herein, determining the set of multicast/broadcast communication parameters further may include operations, features, means, or instructions for determining that a default slot configuration may be used, and determining the default slot configuration based on a common time division duplex uplink-downlink configuration and on a dedicated time division duplex uplink-downlink configuration.

In some examples of the method, apparatuses, and non-transitory computer-readable medium described herein, determining the set of multicast/broadcast communication parameters further may include operations, features, means, or instructions for identifying a multicast PDSCH aggregation factor for receiving the one or more multicast/broadcast downlink signals.

In some examples of the method, apparatuses, and non-transitory computer-readable medium described herein, the multicast PDSCH aggregation factor may be different from a unicast PDSCH aggregation factor.

In some examples of the method, apparatuses, and non-transitory computer-readable medium described herein, a sequence of redundancy versions for the multicast PDSCH aggregation factor may be different from a sequence of redundancy versions for a unicast PDSCH aggregation factor.

In some examples of the method, apparatuses, and non-transitory computer-readable medium described herein, determining the set of multicast/broadcast communication parameters further may include operations, features, means, or instructions for receiving RRC signaling including the resource mapping configuration indicating an interleaver parameter for a virtual resource block configuration to a physical resource block (PRB) configuration, where the interleaver parameter may be defined based on a G-RNTI different from a unicast RNTI, and determining whether to interleave the virtual resource block configuration with the PRB configuration based on the interleaver parameter.

In some examples of the method, apparatuses, and non-transitory computer-readable medium described herein, determining the set of multicast/broadcast communication parameters further may include operations, features, means, or instructions for identifying the downlink reference signal configuration including a default multicast demodulation reference signal (DMRS) configuration different from a unicast DMRS configuration, where the default multicast DMRS configuration includes a set of DMRS parameters, and where the set of DMRS parameters include a DMRS type, an additional position parameter, a maximum length parameter, one or more scrambling parameters, a phase tracking parameter, or a combination thereof.

In some examples of the method, apparatuses, and non-transitory computer-readable medium described herein, the identifying may include operations, features, means, or instructions for identifying the downlink reference signal configuration including the default multicast DMRS configuration based on a time resource allocation table.

In some examples of the method, apparatuses, and non-transitory computer-readable medium described herein, determining the set of multicast/broadcast communication parameters further may include operations, features, means, or instructions for receiving an indication of an RNTI, identifying that the RNTI may be a G-RNTI, and determining the downlink reference signal configuration including a set of default parameters for a phase tracking reference signal (PTRS), where the set of default parameters include a frequency density parameter, a time density parameter, an energy per resource element (EPRE) parameter, a resource element offset parameter, a maximum number of ports parameter, or a combination thereof.

Some examples of the method, apparatuses, and non-transitory computer-readable medium described herein may further include operations, features, means, or instructions for determining a default condition for a presence of the PTRS based on identifying that the RNTI may be the G-RNTI, and based on a modulation and coding scheme (MCS) and a resource block allocation size.

Some examples of the method, apparatuses, and non-transitory computer-readable medium described herein may further include operations, features, means, or instructions for identifying that the PTRS may be not present in the one or more multicast downlink signals based on a threshold size of the MCS, a threshold of the resource block allocation size, a quadrature phase shift keying (QPSK) configuration, or a combination thereof.

In some examples of the method, apparatuses, and non-transitory computer-readable medium described herein, determining the set of multicast communication parameters further may include operations, features, means, or instructions for receiving an indication of an RNTI, identifying that the RNTI may be a G-RNTI, and determining the resource mapping configuration including a bundling size for a PRB configuration based on the identifying.

In some examples of the method, apparatuses, and non-transitory computer-readable medium described herein, the bundling size may be two PRBs.

A method of wireless communications at a base station is described. The method may include identifying a group-specific multicast communication configuration for transmitting one or more multicast downlink signals, where the group-specific multicast communication configuration may be independently configured from a unicast communication configuration, determining a set of multicast communication parameters based on the group-specific multicast communication configuration, the set of multicast communication parameters including a time resource allocation, a frequency resource allocation, a slot configuration, a downlink reference signal configuration, and a resource mapping configuration for transmitting the one or more multicast downlink signals, and transmitting the one or more multicast downlink signals based on the set of multicast communication parameters including the time resource allocation, the frequency resource allocation, and the slot configuration.

An apparatus for wireless communications at a base station is described. The apparatus may include a processor, memory coupled with the processor, and instructions stored in the memory. The instructions may be executable by the processor to cause the apparatus to identify a group-specific multicast communication configuration for transmitting one or more multicast downlink signals, where the group-specific multicast communication configuration may be independently configured from a unicast communication configuration, determine a set of multicast communication parameters based on the group-specific multicast communication configuration, the set of multicast communication parameters including a time resource allocation, a frequency resource allocation, a slot configuration, a downlink reference signal configuration, and a resource mapping configuration for transmitting the one or more multicast downlink signals, and transmit the one or more multicast downlink signals based on the set of multicast communication parameters including the time resource allocation, the frequency resource allocation, and the slot configuration.

Another apparatus for wireless communications at a base station is described. The apparatus may include means for identifying a group-specific multicast communication configuration for transmitting one or more multicast downlink signals, where the group-specific multicast communication configuration may be independently configured from a unicast communication configuration, determining a set of multicast communication parameters based on the group-specific multicast communication configuration, the set of multicast communication parameters including a time resource allocation, a frequency resource allocation, a slot configuration, a downlink reference signal configuration, and a resource mapping configuration for transmitting the one or more multicast downlink signals, and transmitting the one or more multicast downlink signals based on the set of multicast communication parameters including the time resource allocation, the frequency resource allocation, and the slot configuration.

A non-transitory computer-readable medium storing code for wireless communications at a base station is described. The code may include instructions executable by a processor to identify a group-specific multicast communication configuration for transmitting one or more multicast downlink signals, where the group-specific multicast communication configuration may be independently configured from a unicast communication configuration, determine a set of multicast communication parameters based on the group-specific multicast communication configuration, the set of multicast communication parameters including a time resource allocation, a frequency resource allocation, a slot configuration, a downlink reference signal configuration, and a resource mapping configuration for transmitting the one or more multicast downlink signals, and transmit the one or more multicast downlink signals based on the set of multicast communication parameters including the time resource allocation, the frequency resource allocation, and the slot configuration.

Some examples of the method, apparatuses, and non-transitory computer-readable medium described herein may further include operations, features, means, or instructions for transmitting the group-specific multicast communication configuration encoded with a G-RNTI, where different G-RNTIs correspond to different group-specific communication configurations.

Some examples of the method, apparatuses, and non-transitory computer-readable medium described herein may further include operations, features, means, or instructions for transmitting the group-specific multicast communication configuration encoded with a G-RNTI corresponding to a multicast/broadcast traffic channel, where the set of multicast communication parameters corresponding to the group-specific multicast communication configuration and the G-RNTI may be different from parameters associated with a MB-RNTI corresponding to a MBCCH.

Some examples of the method, apparatuses, and non-transitory computer-readable medium described herein may further include operations, features, means, or instructions for transmitting RRC signaling that indicates a G-RNTI, where the G-RNTI may be indicated in a time resource allocation table, the time resource allocation table including a set of rows, where each row of the set of rows may correspond to at least one of a slot offset value, a SLIV, and a PDSCH mapping type.

In some examples of the method, apparatuses, and non-transitory computer-readable medium described herein, the slot offset value may be either 0 or greater than 0.

Some examples of the method, apparatuses, and non-transitory computer-readable medium described herein may further include operations, features, means, or instructions for transmitting a downlink control information signal indicating a subset of rows of a cell-specific allocation table, where the cell-specific allocation table may be based on a G-RNTI configured in a common search space.

Some examples of the method, apparatuses, and non-transitory computer-readable medium described herein may further include operations, features, means, or instructions for transmitting a downlink control information signal indicating a subset of rows of a UE-specific allocation table, where the UE-specific allocation table may be based on a G-RNTI configured in a UE-specific search space.

Some examples of the method, apparatuses, and non-transitory computer-readable medium described herein may further include operations, features, means, or instructions for transmitting RRC signaling that indicates a group-specific frequency resource allocation type and a group-specific resource block group size.

Some examples of the method, apparatuses, and non-transitory computer-readable medium described herein may further include operations, features, means, or instructions for transmitting an indication of a multicast PDSCH aggregation factor.

In some examples of the method, apparatuses, and non-transitory computer-readable medium described herein, the multicast PDSCH aggregation factor may be different from a unicast PDSCH aggregation factor.

In some examples of the method, apparatuses, and non-transitory computer-readable medium described herein, a sequence of redundancy versions for the multicast PDSCH aggregation factor may be different from a sequence of redundancy versions for a unicast PDSCH aggregation factor.

Some examples of the method, apparatuses, and non-transitory computer-readable medium described herein may further include operations, features, means, or instructions for transmitting RRC signaling including the resource mapping configuration indicating an interleaver parameter for a virtual resource block configuration to a PRB configuration, where the interleaver parameter may be defined based on a G-RNTI different from a unicast RNTI.

In some examples of the method, apparatuses, and non-transitory computer-readable medium described herein, the interleaver parameter indicates whether to interleave the virtual resource block configuration with the PRB configuration.

Some examples of the method, apparatuses, and non-transitory computer-readable medium described herein may further include operations, features, means, or instructions for transmitting RRC signaling including the downlink reference signal configuration that indicates a time resource allocation table, the time resource allocation table indicating a multicast DMRS configuration different from a unicast DMRS configuration, where the multicast DMRS configuration includes a set of DMRS parameters.

In some examples of the method, apparatuses, and non-transitory computer-readable medium described herein, the set of DMRS parameters include a DMRS type, an additional position parameter, a maximum length parameter, one or more scrambling parameters, a phase tracking parameter, or a combination thereof.

Some examples of the method, apparatuses, and non-transitory computer-readable medium described herein may further include operations, features, means, or instructions for transmitting an indication of an RNTI.

In some examples of the method, apparatuses, and non-transitory computer-readable medium described herein, the RNTI may be a G-RNTI.

DETAILED DESCRIPTION

Figure 1:
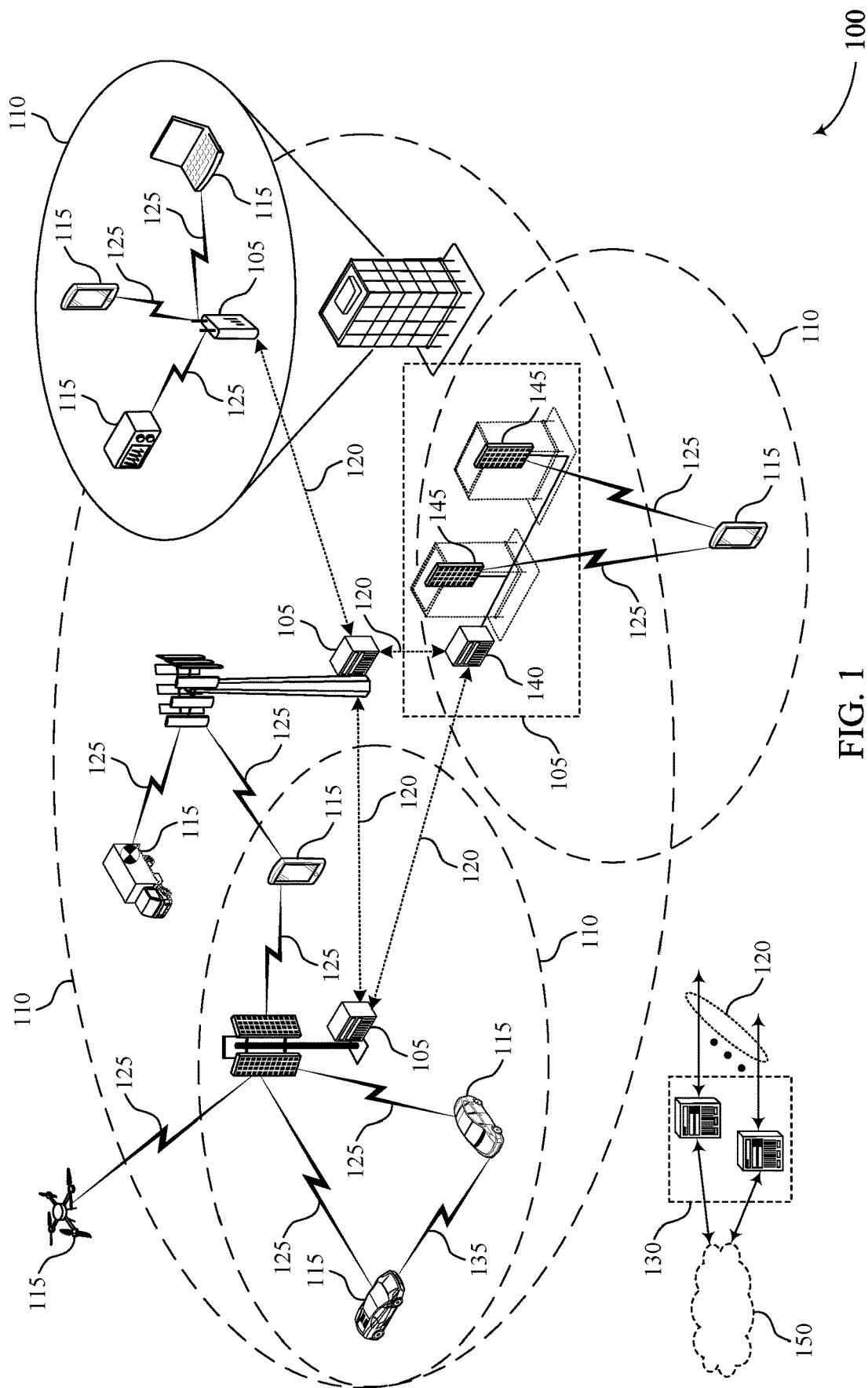
FIG. 1 illustrates an example of a wireless communications system that supports downlink shared channel configuration for multicast in accordance with aspects of the present disclosure.

Some wireless communications systems may include communication devices, such as a UE and a base station (e.g., an eNodeB (eNB), a next-generation NodeB or a giga-NodeB, either of which may be referred to as a gNB, or some other base station), that may support unicast transmissions (e.g., point-to-point (PTP) transmissions), and multicast transmissions (e.g., point-to-multipoint (PTM) transmissions, such as broadcast transmissions). Multicast transmissions may be referred to as multicast, broadcast, or multicast/broadcast transmissions. In some examples, one or more UEs may be configured to receive multicast/broadcast transmissions (e.g., according to a group scheduling mechanism). However, the configuration may be indicated via broadcast system information, which may be transmitted via common signaling (e.g., via a system information block (SIB) in common radio resource control (RRC) signaling, such as a cell-specific configuration), or via unicast signaling (e.g., dedicated RRC signaling, such as a UE-specific configuration). In some cases, a base station may transmit multicast/broadcast data to a group of UEs in the same cell or different cells (e.g., single-frequency network (SFN) transmissions). In such cases, a cell-specific configuration or a UE-specific configuration may result in loss of data or inefficient communications between the base station and the group of UEs.

To support efficient multicast/broadcast communications, a multicast/broadcast communication configuration may be transmitted to a group of one or more UEs for a group multicast transmission session. The group-specific multicast/broadcast communication configuration may be configured independently from unicast communication configurations and cell-specific communication configurations. In some examples, each multicast/broadcast communication configuration may be associated with a group radio network temporary identifier (RNTI) (G-RNTI) (e.g., each group-specific configuration may be identified by signaling including a G-RNTI), and the G-RNTI may correspond to a broadcast traffic channel. The multicast/broadcast communication configuration may include configurations for one or more parameters associated with communications at the UE. For example, the group-specific multicast/broadcast communication may include group-common configurations for one or more of a time resource allocation, a frequency resource allocation, a slot configuration, a downlink reference signal configuration, and a resource mapping configuration for receiving multicast/broadcast downlink signals.

A UE may determine the configurations and parameters. In some cases, the UE may determine the configuration based on signaling from a base station. In some examples (e.g., to reduce RRC signaling overhead), some configuration parameters may not be signaled directly to a UE. The UE may determine values for each of the parameters that may not be signaled in the multicast/broadcast communication configuration based on configured default values for each of the parameters. In some cases, the default value may be the same as an existing value for cell-specific configuration. In other cases, the default value may be the same as an existing value for a UE-specific configuration. Additionally or alternatively, the default value may be pre-configured by the network for multicast/broadcast transmissions. For example, a UE may receive a multicast/broadcast communication configuration that may include group-common configurations for a set of the communication parameters, and the UE may determine to use a default value (e.g., a cell-specific configuration, a UE-specific configuration, or a pre-determined default configuration) for the remainder of the communication parameters.

Aspects of the disclosure are initially described in the context of a wireless communications system. Additional aspects of the disclosure are described with reference to multicast communication configuration messages and process flows. Aspects of the disclosure are further illustrated by and described with reference to apparatus diagrams, system diagrams, and flowcharts that relate to downlink shared channel configuration for multicast.

FIG. 1 illustrates an example of a wireless communications system 100 that supports downlink shared channel configuration for multicast in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others).

In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive a group-specific multicast configuration and determine one or more multicast communication parameters such that the UE 115 may receive group multicast transmissions from a base station 105. For example, the base station 105 may transmit a group multicast transmission to one or more UEs 115 which may be in the same cell or different cells (e.g., coverage areas 110). A UE 115 may receive a group-specific multicast/broadcast communication configuration for receiving the multicast transmission from the base station 105. The group-specific multicast/broadcast communication configuration may be independently configured from a unicast communication configuration. The UE 115 may determine one or more multicast communication parameters according to the group-specific multicast/broadcast communication configuration. The communication parameters may include one or more of a time resource allocation, a frequency resource allocation, a slot configuration, a downlink reference signal configuration and a resource mapping configuration for receiving multicast downlink signals. The UE 115 may receive multicast downlink signals from the base station 105 based on the one or more multicast communication parameters.

Figure 2:
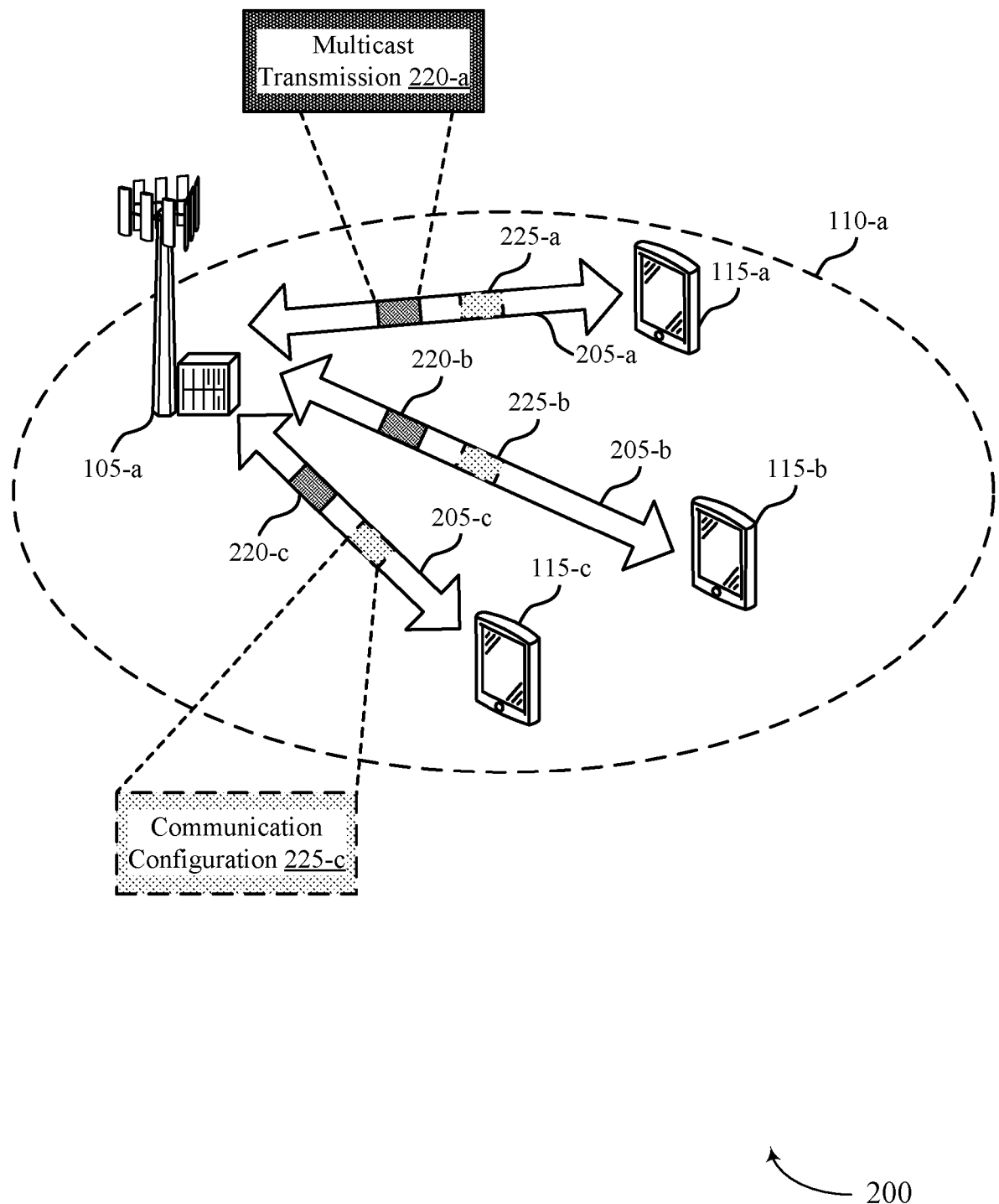
FIG. 2 illustrates an example of a wireless communications system that supports downlink shared channel configuration for multicast in accordance with aspects of the present disclosure.

FIG. 2 illustrates an example of a wireless communications system 200 that supports downlink shared channel configuration for multicast in accordance with aspects of the present disclosure. The wireless communications system 200 may implement aspects of the wireless communications system 100 as described with reference to FIG. 1. For example, the wireless communications system 200 may include a base station 105-a, a UE 115-a, a UE 115-b, and a UE 115-c, which may be examples of a base station 105 and a UE 115 as described with reference to FIG. 1. Base station 105-a may provide coverage over a geographic coverage area 110-a (e.g., a cell), and base station 105-a may communicate with UEs 115-a, 115-b, and 115-c via communication links 205-a, 205-b, and 205-c, respectively. The communication links 205 may include a multicast transmission 220 (e.g., multicast signals for one or more UEs 115) and a communication configuration 225 (e.g., a group configuration that may configure the UEs 115 to receive the multicast transmissions 220). The multicast transmissions 220 may represent examples of multicast communications, broadcast communications, or multicast/broadcast communications.

In some wireless communication systems 200, the UEs 115 may be configured (e.g., via a communication configuration 225) to receive multicast transmissions, broadcast transmissions, or both (e.g., multicast/broadcast transmissions) from a base station 105. In some cases, the multicast transmissions 220 may be separate multicast transmissions 220 (e.g., base station 105-a may transmit multicast data to each UE 115 via each communication link 205). Additionally or alternatively, the multicast transmissions 220 may be a single group-cast message (e.g., a PTM transmission for a group of UEs receiving a type of multicast service, a broadcast transmission, a single-cell point-to-multipoint (SC-PTM) transmission, or a multimedia broadcast multicast service (MBMS) transmission). For example, with reference to FIG. 2, UEs 115-a, 115-b, and 115-c may communicate with base station 105-a via the same cell (e.g., geographic coverage area 110-a).

The UEs 115-a, 115-b, and 115-c may receive communication configurations 225-a, 225-b, and 225-c, respectively, which may configure the UEs 115 to receive multicast transmissions 220-a, 220-b, and 220-c from base station 105-a. The communication configurations 225 may be transmitted via common signaling (e.g., via a system information block (SIB) in common radio resource control (RRC) signaling, such as a cell-specific communication configuration 225), or via unicast signaling (e.g., dedicated RRC signaling, such as a UE-specific communication configuration 225). However, in some wireless communication systems 200, base station 105-a may transmit multicast transmissions 220 to a group of UEs 115 in the same cell or different cells (e.g., SFN transmissions), and common signaling or unicast signaling may not be sufficient for configuring each UE 115 of the group of UEs 115 to receive the group multicast transmission.

As described herein, the UEs 115 communicating with base station 105-a via one or more cells may receive a group-specific multicast/broadcast communication configuration 225, which may improve the reliability and efficiency of multicast transmissions 220. Each group-specific communication configuration 225 may configure a UE 115 to receive group-common multicast transmissions 220 from the base station 105 via one or more cells. For example, the group-specific communication configuration 225 may be applicable to one or more UEs 115 with the same or different UE-specific configurations or may be applicable to one or more UEs 115 in the same or different cells. The group-specific multicast/broadcast communication configuration 225 may be independently configured from unicast communication configurations and cell-specific communication configurations. In some examples, each group-specific communication configuration 225 may be associated with a G-RNTI (e.g., each group-specific communication configuration 225 may be identified by signaling including a G-RNTI). A UE 115 may receive a communication configuration 225 and may determine that the communication configuration 225 is a group-specific communication configuration 225 if the RNTI associated with the communication configuration 225 is a G-RNTI corresponding to a broadcast traffic channel.

The multicast/broadcast communication configurations 225 may be transmitted in a common search space of a shared channel, such as a physical downlink shared channel (PDSCH). In some examples, a common control channel, such as a logical multicast/broadcast control channel (MBCCH), may be configured for transmissions of control data for the multicast communication configuration 225. In one example, a common configuration for control transmissions may be transmitted via an MBCCH according to a multicast/broadcast RNTI (MB-RNTI), which may be different from a G-RNTI (e.g., the MB-RNTI may be associated with lower modulation and coding scheme (MCS) transport block size (TBS), or reduced scheduling flexibility for MBCCH). The common control configuration may configure multicast control channel transmissions. The common control channel configuration may be the same as or different from the group-specific communication configurations 225, which may be used for configuring multicast/broadcast data transmissions (e.g., via a PDSCH).

The group-specific multicast/broadcast communication configurations 225 may include configurations for one or more parameters associated with communications at the UEs 115. For example, the group-specific communication configuration 225 may include group configurations for one or more of a time resource allocation, a frequency resource allocation, a time division duplex configuration, a slot configuration, a PDSCH aggregation factor, an interleaver parameter, a demodulation reference signal (DMRS) configuration, phase tracking reference signal (PTRS) parameters and a physical resource block (PRB) bundling size. Each of the one or more communication parameters may be configured such that the UE 115 may receive group-common multicast transmissions 220. In some examples (e.g., to reduce RRC signaling overhead), base station 105-a may not signal each of the communication parameters to each UE 115. The UEs 115 may determine values for the communication parameters that may not be signaled to the UEs 115 according to configured default values for each of the communication parameters.

There may be one or more options for configuring the default values for communication parameters at the UE 115. In some examples, the default values may be configured according to one or more of existing cell-specific communication configurations 225, existing UE-specific communication configurations 225, or multicast group-specific configurations pre-defined by the network. For example, a UE 115 may receive cell-specific communication configurations 225, UE-specific communication configurations 225 (e.g., via common or dedicated RRC signaling), and multicast group-specific configurations defined by the network, and the UE 115 may determine one or more communication parameters according to one or more of the configurations provided.

In a first option, the UE 115 may be configured such that the default value for the communication parameters may be the same as the value configured via the cell-specific communication configuration 225. For example, UEs 115-a, 115-b, and 115-c may be in the same cell, and thus the values of the communication parameters configured via the cell-specific communication configurations 225 transmitted to each of the UEs 115-a, 115-b, and 115-c, may be used as default values. In a second option, a UE 115 may be configured such that the default value for the communication parameters are the same as the value configured via the UE-specific communication configuration 225. For example, base station 105-a may determine that the UE-specific communication configurations 225 transmitted to UEs 115-a, 115-b, and 115-c are the same, and may thus configure the default values of the communication parameters to be the values provided by the UE-specific communication configurations 225. In a third option, the network may pre-define values for multicast/broadcast group-specific configuration, and the multicast/broadcast group-specific configuration values may be used as default values by a UE 115 if the UE 115 does not receive a group-specific communication configuration 225.

Base station 105-a may transmit a group-specific multicast/broadcast communication configuration 225-c to UE 115-c via communication link 205-c. Similarly, base station 105-a may transmit communication configurations 225-a and 225-b to UEs 115-a and 115-b, respectively. Group-specific multicast/broadcast communication configuration 225-c may include group-common configurations for one or more communication parameters at UE 115-c. Base station 105-a may transmit group-specific multicast/broadcast communication configurations 225-b and 225-a to UEs 115-b and 115-a, respectively, which may be the same as group-specific multicast/broadcast communication configuration 225-c. Base station 105-a may refrain from transmitting group-common configurations for one or more parameters in the group-specific multicast/broadcast communication configurations 225-a, 225-b, and 225-c (e.g., to reduce signaling overhead). For example, base station 105-a may refrain from transmitting a group-common configuration for time resource allocations (e.g., base station 105-a may determine that the UEs 115 received the same cell-specific communication configuration 225 for the time resource allocation parameter). Instead, the UEs 115-a, 115-b, and 115-c may configure the time resource allocations for multicast according to default values for the time resource allocation parameter (e.g., according to a cell-specific configuration for time resource allocations).

In the wireless communications system 200, a UE 115 may therefore receive a multicast/broadcast group-specific communication configuration 225, which may configure the UE 115 with one or more communication parameters such that the UE 115 may receive multicast transmissions 220 (e.g., multicast/broadcast transmissions) from a base station 105. Each of the communication parameters at the UEs 115 may be configured according to a group-common configuration in the group-specific multicast/broadcast communication configurations 225, or the communication parameters may be configured according to default values (e.g., UE-specific values, cell-specific values and pre-configured group-common values).

Figure 3:
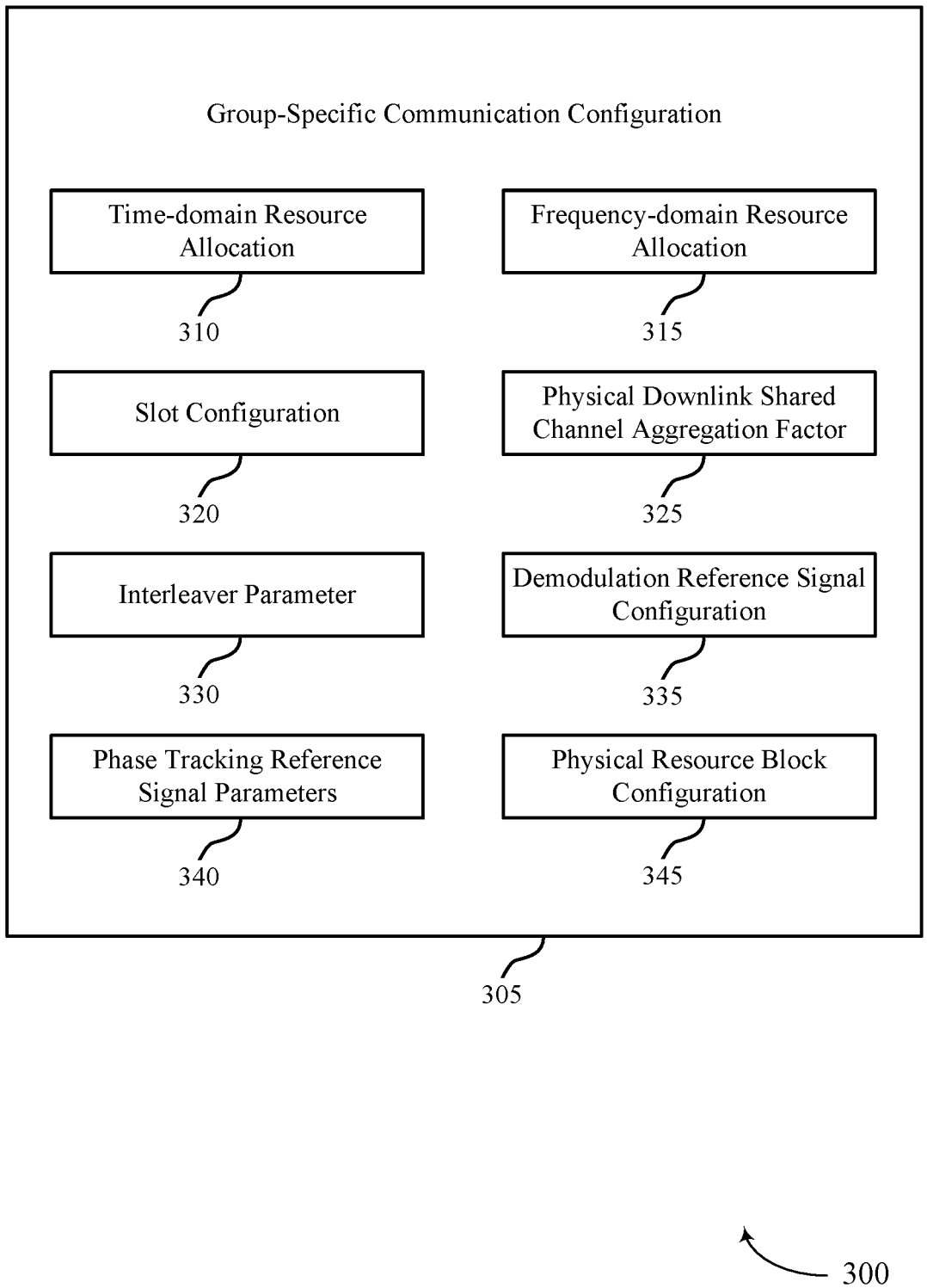
FIG. 3 illustrates an example of a multicast communication configuration that supports downlink shared channel configuration for multicast in accordance with aspects of the present disclosure.

FIG. 3 illustrates an example of a multicast communication configuration message 300 that supports downlink shared channel configuration for multicast in accordance with aspects of the present disclosure. The multicast communication configuration message 300 may support aspects of the wireless communications system 200, as described with reference to FIG. 2. For example, the multicast communication configuration message 300 may be based on a configuration by the base station 105-a, and may be implemented by the UEs 115-a, 115-b, and 115-c. The multicast communication configuration message 300 may include a group-specific communication configuration 305. The group-specific communication configuration 305 may configure one or more UEs 115 to receive group-common multicast/broadcast transmissions, as described with reference to the group-specific multicast/broadcast communication configurations 225 in FIG. 2. The group-specific communication configuration 305 may include a group-common configuration for one or more of a time-domain resource allocation 310, a frequency-domain resource allocation 315, a slot configuration 320, a PDSCH aggregation factor 325, an interleaver parameter 330, a DMRS configuration 335, PTRS parameters 340, a PRB configuration 345, or a combination of these.

As described herein, in some examples, the base station 105-a may configure one or more UEs 115 with a group-specific communication configuration 305 such that the UEs 115 may receive multicast/broadcast data transmissions from the base station 105-a (e.g., separate multicast data transmissions, the same multicast data transmissions, broadcast transmissions, SC-PTM transmissions, MBMS transmissions, etc.) during a group-common multicast session. The multicast communication configuration message 300 may be transmitted according to a G-RNTI corresponding to a broadcast traffic channel (e.g., via RRC signaling including a G-RNTI). In some examples, the UEs 115 may determine that the RNTI associated with the multicast communication configuration message 300 is a G-RNTI, and the message includes group-common configurations, accordingly.

In some examples, base station 105-a may refrain from signaling group-common configurations for each of the communication parameters in the group-specific communication configuration 305, and the UE 115 may determine a value for the communication parameter according to a set of default values configured at the UE 115. In a first option, the default value may be the same as an existing value for cell-specific configuration. In a second option, the default value may be the same as an existing value for a UE-specific configuration. Additionally or alternatively, in a third option, the default value may be pre-configured for multicast transmissions by the network. Various techniques for configuring a group-common value for each of the communication parameters or determining a default value for the communication parameters are further described herein.

The group-specific communication configuration 305 may include a configuration for time-domain resource allocation 310. The time-domain resource allocation 310 may be configured via signaling indicating a time-domain resource allocation table (e.g., via RRC signaling for multicast configurations, which may define a group-specific resource allocation table, such as pdsch-TimeDomainAllocationList). The resource allocation table may be transmitted according to a G-RNTI. The resource allocation table may include one or more rows, and each row may be commonly defined for group multicast transmissions. For example, the resource allocation table may include a list of resource allocations, such as physical downlink control channel (PDCCH) allocation list (e.g., pdcch-AllocationList), and each row of the table may indicate time-domain resource allocation for each corresponding group-common multicast transmission.

Each row of the table may include one or more parameters associated with the corresponding group-common multicast transmission. For example, each row may include one or more of an offset value (e.g., an offset parameter, such as $K_0$, which may indicate a gap between a slot in which a downlink grant is received in PDCCH and a slot in which a PDSCH is received), a start and length indicator value (SLIV) (e.g., a parameter such as startSymbolAndLength, which may indicate a combination of a starting symbol number and a duration of the transmissions), and a PDSCH mapping type (e.g., slot-based scheduling or mini-slot-based scheduling). In some examples, the offset value may indicate if PDSCH and PDCCH transmissions are scheduled in the same slot (e.g., if $K_0=0$, such as during unicast transmissions). Additionally or alternatively, the offset value may indicate that cross-slot communications are configured (e.g., if $K_0>0$, which may be determined according to a capability of the UE 115 during multicast transmissions). In some examples, the PDSCH mapping parameter may indicate that the time-domain resources may be configured according to slot-based transmissions (e.g., Type A PDSCH mapping). Slot-based transmissions may indicate that the PDSCH transmissions may begin in a symbol located near the beginning of a slot (e.g., PDSCH transmissions may begin in one of the first four symbols of a slot). Additionally or alternatively, the PDSCH mapping parameter may indicate that the time-domain resources may be configured according to mini-slot-based transmissions (e.g., Type B PDSCH mapping). Mini-slot-based transmissions may indicate a duration of the transmissions (e.g., the transmissions may have a duration of 2, 4 or 7). In some examples, slot-based and mini-slot-based transmissions may be differentiated because the starting point of the PDSCH transmissions may impact a location of a DMRS signal.

A default value for time-domain resource allocations 310 during group-specific multicast/broadcast transmissions may be configured for a UE 115 according to one or more different cases. In a first case, a group configuration for time-domain resource allocations 310 during multicast/broadcast transmissions may not be configured, and transmission of G-RNTI may be permitted in a common search space. In such cases, a cell-specific resource allocation table may be configured in a common configuration, such as pdsch-ConfigCommon, and a subset of the entries in the cell-specific allocation table may be used as default values for the time-domain resource allocation 310. In some cases (e.g., UEs 115 receiving a multicast/broadcast transmission), the common entries in the cell-specific table may be indicated by downlink control information (DCI). In a second case, a G-RNTI may be transmitted in a UE-specific search space (USS), and a resource allocation table may be configured in a UE-specific configuration (e.g., pdsch-Config). A subset of entries in the UE-specific resource allocation table may be indicated to a UE 115 via DCI, and the subset of entries may be configured as a default value for configuration of the time-domain resource allocation 310 (e.g., rows 0-7 may be the same for multiple UEs 115, and one row of the subset of rows may be indicated to a UE 115 such that the configuration may be the same across UEs 115). In a third case, a default time-domain resource allocation table may be configured (e.g., specified by the network) for configuration of multicast time-domain resource allocation 310. In one example, a first default table (e.g., X1) may be configured for a first duration cyclic prefix (CP) associated with G-RNTI transmissions, and a second default table (e.g., X2) may be configured for a second duration of CPs (e.g., extended CPs) associated with G-RNTI transmissions.

The group-specific communication configuration 305 may include a group-common configuration for frequency-domain resource allocation 315, which may be transmitted for multicast/broadcast with G-RNTI (e.g., may be different from unicast configurations). In some wireless communications networks (e.g., NR networks), there may be one or more types of frequency-domain resource allocations 315 for flexible downlink transmissions, and the group-common configuration for frequency-domain resource allocation 315 may indicate the type of frequency resource allocation. For example, the group-common configuration may be transmitted via RRC signaling including a resource allocation type indication parameter (e.g., resourceAllocation ENUMERATED {resourceAllocation Type0, resourceAllocation-Type1, dynamicSwitch}). A first resource allocation type (e.g., Type 0) may allocate frequency resources according to a frequency domain bitmap. For example, each bit of a frequency domain bitmap may correspond to a resource block group (RBG) size. A second type of resource allocation (e.g., Type 1) may allocate contiguous frequency resources according to a starting resource block (RB) and a number of RB groups (RBGs) (e.g., the starting RB and RBG length may be indicated via DCI format 1_0 or DCI format 1_2). Additionally or alternatively, the group-common configuration for frequency-domain resource allocation 315 may indicate a group-specific RBG size for multicast transmissions with G-RNTI (e.g., according to a parameter such as rbg-Size ENUMERATED {config1, config2}). In some cases, the group-specific RBG size for multicast transmissions may be larger than an RBG size for per-UE 115 unicast transmissions (e.g., a multicast transmission may be configured for one or more UEs 115, and may thus include a larger RBG size).

A default value for frequency-domain resource allocation 315 during group-specific multicast/broadcast transmissions may be configured for a UE 115. In some examples, the default value for the resource allocation type may be configured according to a DCI format. For example, a first DCI format (e.g., DCI format 1_0) may indicate a type of resource allocation that may be configured as the default (e.g., DCI format 1_0 with G-RNTI may use the Type 1 resource allocation according to a starting RB and RBG length), and a second DCI format (e.g., DCI format 1_1) may indicate a type of resource allocation that may be configured as the default (e.g., DCI format 1_1 with G-RNTI may use the Type 1 or Type 0 resource allocation based on a frequency-domain bitmap). In some examples, the default value for the RBG size for multicast transmissions may be configured as a larger RBG size (e.g., config2), which may impact the DCI field number (e.g., may provide room for a DCI bit for indicating multicast transmissions).

The multicast communication configuration message 300 may include a group-common slot configuration 320. In some cases, the group-common slot configuration 320 may be configured according to a group-common time division duplex (TDD) configuration (e.g., the TDD configuration for multicast signaling may be provided by a parameter in RRC signaling, such as tdd-ul-dl-configCommonMulticast). For example, a UE 115 may receive the group-common TDD configuration, and the UE 115 may determine a slot format and a number of slots for receiving multicast transmissions (e.g., the UE 115 may set the slot format per slot over a number of slots according to the TDD configuration).

In some examples, the UE 115 may not receive the group-common slot configuration 320 in the multicast communication configuration message 300. The UE 115 may be configured with a default value for the slot configuration 320. In one example, each UE 115 of a multicast group of UEs 115 (e.g., a group of UEs 115 that may receive a group multicast transmission) may receive a common TDD configuration (e.g., a common TDD configuration transmitted via a parameter in common RRC signaling, such as tdd-ul-dl-ConfigCommon). The default value for the slot configuration 320 may be configured according to the common TDD configuration. Additionally or alternatively, in some examples each of the UEs 115 in the multicast group may be configured to receive a dedicated TDD configuration (e.g., a UE-specific TDD configuration transmitted via dedicated RRC signaling, such as tdd-ul-dl-ConfigDedicated), and the default value for the slot configuration 320 may be configured according to the dedicated TDD configuration.

The multicast communication configuration message 300 may include a group-common configuration for a PDSCH aggregation factor 325. In some examples, the PDSCH aggregation factor 325 may improve the link budget or coverage of the downlink transmissions via the PDSCH. In some examples (e.g., unicast transmissions), the PDSCH slot aggregation factor 325 may be configured according to UE-specific signaling (e.g., according to a parameter in unicast RRC signaling, such as pdsch-AggregationFactor), such that the symbol allocation may be the same across one or more consecutive slots (e.g., consecutive slot numbers 2, 4, or 8). In such examples, one or more of the resource allocation parameters may be the same across the aggregated slots, and the redundancy versions (RVs) (e.g., $rv_{id}$) for each slot may follow a default sequence (e.g., {0, 2, 3, 1, 0, 2, 3, 1, . . . }). In some examples, transmission of the PDSCH aggregation factor 325 may not be transmitted via cell-specific transmissions (e.g., transmission of the PDSCH aggregation factor 325 may be incompatible with SIB transmissions). In the example of FIG. 3, the configuration of the group-common PDSCH aggregation factor 325 may be different from the configuration of unicast PDSCH aggregation factor 325. For example, the group-common PDSCH aggregation factor 325 may be transmitted via group-specific signaling (e.g., via a group-specific parameter in RRC signaling for multicast transmissions, such as pdsch-AggregationFactor multicast). For example, the group-common PDSCH RV sequence may be configured via group-specific signaling (e.g., via a group-specific parameter in RRC signaling for multicast transmissions). In some examples of multicast/broadcast transmissions, the multicast communication configuration message 300 may configure the multicast PDSCH aggregation factor 325 such that one or more scheduling gaps may occur (e.g., a periodic gap may occur after the first slot, after each slot, or after each of a set of slots). The one or more scheduling gaps may be used for scheduling one or more UEs 115 to receive multicast/broadcast transmissions.

A default value for the group-specific configuration of the PDSCH aggregation factor 325 may be configured. In some examples, multicast/broadcast transmissions may be intended for a group of one or more UEs 115 in one or multiple cells. As such, the default value for the group-specific PDSCH aggregation factor 325 may be configured to be larger than a UE-specific value (e.g., for unicast transmissions, the PDSCH aggregation factor 325 may be set to 2, and for multicast transmissions, the default PDSCH aggregation factor 325 may be set to 4). Additionally or alternatively, the redundancy version (RV) for multicast transmissions may follow a default sequence, which may include more RVs than the default sequence for unicast transmissions. For example, the RV identifier ($rv_{id}$) for multicast transmissions may follow the default sequence {0, 1, 2, 3, . . . }. In another example, the RV identifier may follow the sequence {2, 0, 3, 1, . . . } with a boosted coding rate for the first slot. Additionally or alternatively, the $rv_{id}$ may include more than four RVs with the corresponding pre-defined RV sequence.

The multicast communication configuration message 300 may include a group-common configuration for an interleaver parameter 330. The interleaver parameter 330 may be a parameter for interleaving a virtual resource block (VRB) configuration (e.g., coded bits for resource allocations) with a PRB configuration (e.g., physical resource allocations), which may improve code block diversity within the PDSCH. In some examples, the interleaving between VRB and PRB may be switched on and off (e.g., the VRB and PRB configurations may be interleaved or may not be interleaved) according to a bit in a downlink grant (e.g., a bit in DCI format). The group-specific interleaver parameter 330 may be transmitted via group common signaling (e.g., the interleaver parameter 330 may be indicated via a parameter in RRC signaling including a G-RNTI, such as vrb-ToPRB-Interleaver ENUMERATED {n2, n4} OPTIONAL). In the case of multicast/broadcast transmissions, the interleaver parameter 330 may be configured according to a group-common configuration such that the mapping between coded bits and physical resource elements may reflect the group-common multicast transmissions (e.g., the configured number of steps, such as n2, may be configured to be different for multicast/broadcast transmissions than for unicast transmissions).

The multicast communication configuration message 300 may include a group-common DMRS configuration 335. The group-common DMRS configuration 335 may include one or more DMRS parameters (e.g., one or more of a DMRS type, a DMRS additional position parameter, a maximum DMRS length parameter, one or more scrambling identifier (ID) parameters, or a phase tracking parameter), which may be configured via RRC signaling. In some examples, the DMRS configuration 335 may correspond to a type of multicast PDSCH resource mapping (e.g., Type A or Type B). Additionally or alternatively, the default symbol position for the DMRS may be configured according to the time-domain resource allocation table described herein. In one example, a default value for the group-common DMRS configuration 335 may be a DMRS configuration type (e.g., DMRS config Type 1).

The multicast communication configuration message 300 may include a group-common configuration for one or more PTRS parameters 340. For example, group-common signaling (e.g., RRC signaling including a G-RNTI) may configure the PTRS parameters 340 such that the group-common configuration of the PTRS parameters 340 may be different from the configuration of PTRS parameters 340 identified by UE-specific signaling. The PTRS parameters 340 may include one or more of a frequency density parameter, a time density parameter, an energy per resource element (EPRE) parameter, a resource element offset parameter, or a maximum number of ports parameter. The PTRS parameters 340 may be configured according to the type of multicast/broadcast PDSCH transmissions (e.g., Type A or Type B).

In some examples, a UE 115 may determine if a PTRS is present in one or more multicast downlink signals and the UE 115 may determine the density of the PTRS signals according to a size of an MCS, an RB allocation size, or a quadrature phase shift keying (QPSK) scheme, or a combination of these. For example, for multicast transmissions including a G-RNTI, a default condition for PTRS presence may be configured according to a phase noise characteristic capability of a UE 115 to be the same as a PTRS presence configured for cell-specific transmission including a C-RNTI (e.g., the default condition for PTRS presence may be different than the cell-specific configuration if the UE 115 is configured with a low capability). In some examples, if the size of the MCS is less than 10 (e.g., a 64 quadrature amplitude modulation (QAM) MCS table), less than 5 (e.g., a 256 QAM MCS table) or less than 15 (e.g., a 256 QAM low SE MCS table), or the bandwidth of the MCS is less than 3 PRBs, the PTRS may not be present for multicast data transmissions, and a QPSK may be used. Additionally or alternatively, a UE 115 may be configured to assume that PTRS may not be present (e.g., multicast transmissions may be limited to use low MCS and QPSK, such as SIB and paging transmissions). For example, there may not be PTRS for a MBCCH if QPSK is used, and there may be PTRS for a multicast/broadcast traffic channel (MBTCH) with a modulation greater than or equal to 16 QAM.

A group-common PRB configuration 345 may be included in the multicast communication configuration message 300. In some examples, a bundling size for RBs may be configured dynamically or semi-statically to provide flexibility of transmissions (e.g., the bundling size, $P_{BWP,i}'$, may be configured as 2, 4, or 'Wideband'). The bundling size may indicate a precoding size for a number of consecutive RBs. In the case of multicast transmissions, the group-common PRB configuration 345 may be configured for a group of UEs 115 (e.g., the RB bundling size may be configured more statically to accommodate each UE 115 of the group of UEs 115). For example, group-specific signaling including a G-RNTI may indicate (e.g., via a parameter such as prb-BundlingType) a bundling size of 2 PRBs via the PRB configuration 345 to a group of UEs 115 (e.g., a static configuration of the RB bundling size indicated via RRC signaling).

As described herein, the multicast communication configuration message 300 may be transmitted via a common search space according to a G-RNTI, and may configure a group of UEs 115 to receive group-common multicast/broadcast transmissions. The multicast communication configuration message 300 may include a group-specific communication configuration 305, which may indicate group-specific configurations for one or more communication parameters at the UE 115. In some examples, the group-specific communication configuration 305 may not indicate one or more of the communication parameters, and the communication parameters may be configured according to default values at the UE 115.

Figure 4:
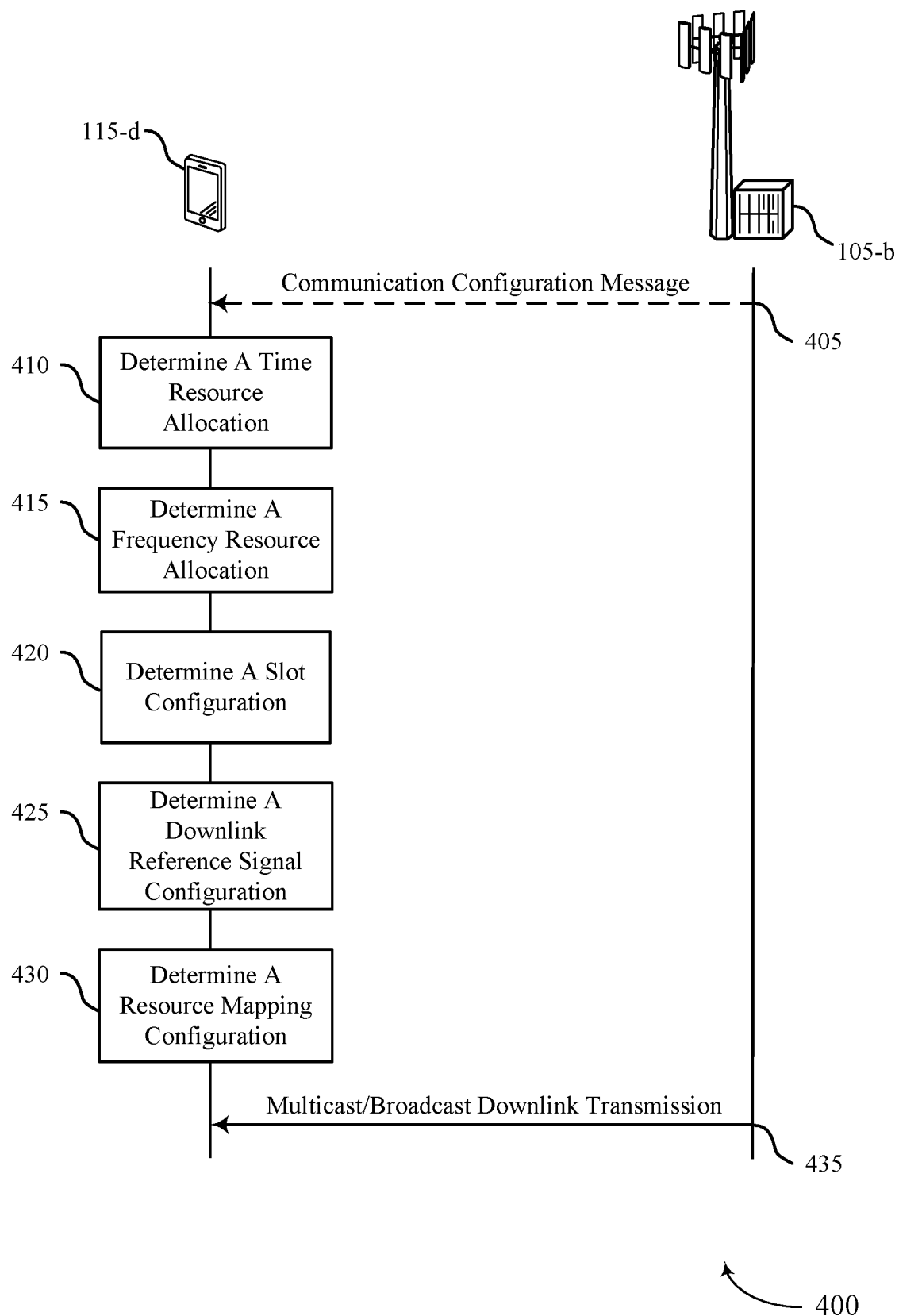
FIG. 4 illustrates an example of a process flow that supports downlink shared channel configuration for multicast in accordance with aspects of the present disclosure.

FIG. 4 illustrates an example of a process flow 400 that supports downlink shared channel configuration for multicast in accordance with aspects of the present disclosure. The process flow 400 may implement aspects of the wireless communications system 100 and the wireless communications system 200 as described with reference to FIGS. 1 and 2. For instance, in the example of FIG. 4, a base station 105 (e.g., base station 105-b) may communicate with one or more UEs 115 (e.g., including UE 115-d), which may be located in one or more coverage areas (e.g., cells), as described with reference to FIGS. 1 and 2. The base station 105 may communicate with the UEs 115 via respective communication links, which may be examples of communication links 205 as described with reference to FIG. 2. Each communication link may include a multicast communication configuration or a multicast transmission, as described with reference to FIG. 2. In some examples, a UE 115 may determine one or more group-specific multicast/broadcast communication parameters according to the communication configuration message or one or more predetermined default values for the communication parameters. The UE 115 may receive a multicast transmission from a base station 105 according to the determined communication parameters.

The process flow 400 may illustrate operations between a base station 105-b and a UE 115-d, which may be examples of a base station 105 and a UE 115 as described with reference to FIGS. 1 and 2. The process flow 400 may be based on a configuration by base station 105-b, and may be implemented by UE 115-d to configure UE 115-d to receive group multicast/broadcast transmissions (e.g., multicast/broadcast transmissions from base station 105-b to one or more UEs 115 in the same or different cells). In the following description of the process flow 400, the operations between base station 105-b and UE 115-d may be transmitted in a different order than the example order shown, or the operations performed by base station 105-b and UE 115-d may be performed in different orders or at different times. Some operations may also be omitted from the process flow 400, and other operations may be added to the process flow 400.

At 405, in some cases, base station 105-b may transmit a communication configuration message, such as a group-specific multicast/broadcast communication configuration message. The multicast/broadcast communication configuration message may be independently configured from a unicast communication configuration (e.g., a UE-specific configuration) or a cell-specific configuration. For example, the multicast communication configuration message may be transmitted to one or more UEs 115 that may be in the same or different cells. The multicast communication configuration message may be encoded with a G-RNTI corresponding to a broadcast traffic channel. In some examples, each G-RNTI may correspond to a different multicast communication configuration.

UE 115-d may determine that the communication configuration message received at 405 is a group-specific multicast/broadcast communication configuration if the RNTI of the configuration message is a G-RNTI corresponding to a broadcast traffic channel. The multicast/broadcast communication configuration may include group-specific configurations for one or more multicast/broadcast communication parameters. The configurations for the multicast/broadcast communication parameters may be indicated to UE 115-d via RRC signaling (e.g., the multicast/broadcast communication configuration message may be transmitted via RRC signaling at 405). Parameters that may be configured with a group-specific multicast/broadcast configuration via the communication configuration message may include, or may be related to, one or more of a time resource allocation, frequency resource allocation, slot configuration, PDSCH slot aggregation, VRB to PRB interleaver, DMRS, PTRS, and PRB bundling. In some examples, some of the communication parameters may not be explicitly configured for group-specific multicast/broadcast transmissions via the multicast/broadcast communication configuration message, and UE 115-*d* may determine for which communication parameters a group-specific multicast/broadcast configuration may have been indicated. UE 115-*d* may apply the parameters that were indicated in the group-specific multicast/broadcast communication. UE 115-*d* may determine the value of each of the parameters that were not indicated in the group-specific multicast/broadcast configuration based on one or more rules or predetermined parameters.

At 410, UE 115-*d* may determine a time resource allocation for receiving multicast/broadcast transmissions. In some cases, UE 115-*d* may determine the time resource allocation based on a group-specific configuration received via the communication configuration message at 405. For example, the communication configuration message may be encoded with a G-RNTI, and UE 115-*d* may receive the communication configuration message including a group-specific multicast configuration for time resource allocation at 405. The group-specific multicast configuration for time resource allocation may be indicated via a time resource allocation table (e.g., pdsch-TimeDomainAllocationList). The time resource allocation table may include one or more rows, and each row of the table may correspond to a different group-specific multicast/broadcast transmission. For example, each row may include a different combination of one or more parameters for time resource allocation, such as at least one of a slot offset value (e.g., $K_0$), a SLIV, and a PDSCH mapping type that may correspond to a group-specific time resource allocation for receiving a group multicast transmission. In some examples, the group-specific multicast/broadcast configuration for time resource allocation may include a multicast slot offset value (e.g., the offset between the slot in which a downlink grant is received and the slot in which the multicast PDSCH is received) that UE 115-*d* may use to receive the group-specific multicast/broadcast transmissions. In one example, the value of the multicast slot offset may be greater than or equal to 0 for multicast transmissions (e.g., because some multicast UEs 115 may be low-capability UEs 115).

Additionally or alternatively, at 410 UE 115-*d* may determine the time resource allocation according to one or more default parameters. For example, in some cases base station 105-*b* may refrain from transmitting a group-specific multicast/broadcast configuration for time resource allocation to UE 115-*d*, and UE 115-*d* may determine a value for time resource allocation based on a cell-specific default configuration, a UE-specific default configuration or a pre-determined multicast default configuration. In one example, UE 115-*d* may determine that transmission of G-RNTI in a common search space is configured, and UE 115-*d* may receive a cell-specific allocation table (e.g., a cell-specific allocation table provided via a common PDSCH, such as pdsch-ConfigCommon for multicast). UE 115-*d* may receive DCI that may indicate a subset of the rows included in the cell-specific allocation table that UE 115-*d* may use to determine default values for the time resource allocation. In another example, UE 115-*d* may determine that transmission of G-RNTI in a UE-specific search space is configured, and UE 115-*d* may receive a UE-specific allocation table (e.g., provided via pdsch-Config). UE 115-*d* may receive DCI that may indicate a subset of rows of the UE-specific allocation table for UE 115-*d* to use to determine default values for the time resource allocation. In a third example, a default time resource allocation table may be pre-configured by the network. UE 115-*d* may identify default values for the multicast time resource allocation from the default multicast resource allocation table.

At 415, UE 115-*d* may determine a frequency resource allocation. In some cases, the multicast/broadcast communication configuration message received at 405 may include a group-specific configuration for frequency resource allocation. In some examples, the group-specific configuration for frequency resource allocation may include a group-specific frequency allocation type and a group-specific RBG size for receiving multicast transmissions. For example, UE 115-*d* may receive an indication of a group-specific frequency allocation type (e.g., Type 0 or Type 1) that UE 115-*d* may use to determine available frequency resources. Additionally or alternatively, UE 115-*d* may receive an indication of a group-specific RBG size for receiving multicast transmissions with G-RNTI.

In some examples, at 415, UE 115-*d* may determine that one or more default values of the frequency resource allocation are to be used. For example, base station 105-*b* may refrain from transmitting a group-specific multicast/broadcast configuration for the frequency resource allocation in the multicast/broadcast communication configuration message, and UE 115-*d* may determine a value for the multicast frequency resource allocation according to an indication received via DCI or a pre-configured default value. In some examples, UE 115-*d* may receive DCI from base station 105-*b* or another network node, and UE 115-*d* may determine a default value for a frequency resource allocation type according to the format of the received DCI. In one example, a first DCI format (e.g., DCI format 1_0) encoded with a G-RNTI may indicate that UE 115-*d* should use a first resource allocation, such as Type 1, while a second DCI format (e.g., DCI format 1_1) encoded with a G-RNTI may indicate that UE 115-*d* should use either the first type or a second type of resource allocation, such as Type 0. Additionally or alternatively, UE 115-*d* may receive a configuration for a default RBG size via RRC signaling (e.g., a group-specific RBG size based on a G-RNTI). UE 115-*d* may determine the RBG size for the multicast frequency resource allocation configuration based on the default RBG size.

At 420, UE 115-*d* may determine a slot configuration. In some examples, the slot configuration may be determined according to a group-specific multicast/broadcast slot configuration received via the communication configuration message at 405. For example, UE 115-*d* may receive a dedicated group-specific slot configuration for multicast/broadcast transmissions (e.g., a dedicated configuration transmitted via RRC signaling, such as tdd-ul-dl-config-CommonMulticast) via the communication configuration message. Additionally or alternatively, UE 115-*d* may determine that a default slot configuration should be used. In one case, (e.g., if one or more UEs 115 of the group of UEs 115 that are to receive the multicast transmissions are not configured with the same dedicated configuration), UE 115-*d* may determine the default slot configuration based on a common TDD slot configuration (e.g., a common TDD uplink-downlink slot configuration, such as tdd-ul-dl-con-figCommon). In a second case (e.g., if each UE 115 of the group of UEs 115 is configured with the same dedicated configuration), UE 115-*d* may determine the default slot configuration based on the common TDD slot configuration or the dedicated slot configuration (e.g., a dedicated TDD uplink-downlink slot configuration, such as tdd-ul-dl-configDedicated).

At 425, UE 115-d may determine a downlink reference signal configuration. In some examples, the downlink reference signal configuration may be determined according to a group-specific multicast/broadcast downlink reference signal configuration received via the communication configuration message at 405. The downlink reference signal configuration may include a multicast DMRS configuration and a multicast configuration for one or more parameters for a PTRS. The multicast DMRS configuration may include one or more DMRS parameters (e.g., one or more of a DMRS type, an additional position parameter, a maximum length parameter, one or more scrambling parameters, or a phase tracking parameter). In some cases, UE 115-d may determine the downlink reference signal configuration based on a default multicast DMRS configuration. The default multicast DMRS configuration may be based on the time resource allocation table used to determine a time resource allocation at 410. In some examples, the downlink reference signal configuration may include multicast configurations for one or more PTRS parameters (e.g., one or more of a frequency density parameter, a time density parameter, an EPRE parameter, an RE offset parameter, or a maximum number of ports parameter). The multicast PTRS parameters may be configured based on the G-RNTI associated with the communication configuration message. Additionally or alternatively, the PTRS parameters may be configured according to an MCS or an RB allocation size.

At 430, UE 115-d may determine a resource mapping configuration. The resource mapping configuration may be a multicast/broadcast resource mapping configuration configured independently from unicast resource mapping configurations. The multicast/broadcast resource mapping configuration may include one or more of an interleaver parameter for a VRB configuration to a PRB configuration, a bundling size for a PRB configuration, and a PDSCH aggregation factor. The VRB to PRB interleaver parameter may indicate whether the VRB configuration may be interleaved with the PRB configuration for multicast transmissions. In some examples, UE 115-d may determine the interleaver parameter according to a configuration indicated via RRC signaling. In some examples, a pre-determined interleaver parameter for multicast transmissions may be configured based on a G-RNTI (e.g., configured independently form unicast transmissions). In some examples, the bundling size for a PRB configuration may be determined based on a group-specific configuration received via the multicast/broadcast communication configuration message at 405 or based on a default bundling size for multicast transmissions. In one example, a default multicast bundling size parameter (e.g., a bundling size parameter, such as prb-BundlingType, that may be configured for multicast transmissions), may be configured to equal 2 PRBs (e.g., based on an identified G-RNTI).

In some examples, as part of the determination of a resource mapping configuration at 430, UE 115-d may determine a group-specific configuration for a multicast/broadcast PDSCH aggregation factor (e.g., a number of consecutive slots with the same symbol allocation). UE 115-d may determine to use a PDSCH aggregation factor indicated via the multicast communication configuration message received at 405. Additionally or alternatively, UE 115-d may determine to use a default value for a multicast/broadcast PDSCH aggregation factor (e.g., a pre-configured value for a multicast PDSCH slot aggregation factor indicated via RRC signaling, such as pdsch-AggregationFactor-_multicast=4). The configuration for a PDSCH aggregation factor may include one or more RVs (e.g., $rv_{id}$), which may follow a default sequence. The RV sequence for a multicast/broadcast PDSCH aggregation factor may be configured independently from an RV sequence for a unicast PDSCH aggregation factor.

At 435, base station 105-b may transmit a multicast/broadcast downlink transmission to UE 115-d. UE 115-d may receive the multicast downlink transmission according to the determined communication parameters. For example, UE 115-d may receive the multicast/broadcast downlink transmission according to the group-specific configurations for the communication parameters that may have been received via the communication configuration message at 405 or determined by UE 115-d at 410, 415, 420, or 425. In some examples, the multicast/broadcast downlink transmission may be encoded with a G-RNTI corresponding to a broadcast traffic channel, and the multicast/broadcast downlink transmission may include downlink data for a group of UEs 115. In one example, each multicast/broadcast downlink transmission of a set of multicast/broadcast transmissions (e.g., a multicast/broadcast transmission transmitted by a different base station 105 or received at a different group of UEs 115) may be encoded with a different G-RNTI. The G-RNTI may indicate to each receiving UE 115, such as UE 115-d that the multicast/broadcast downlink transmission is a group-common multicast/broadcast downlink transmission, or that UE 115-d may receive the multicast/broadcast downlink transmission according to a group-specific communication configuration.

UE 115-d may thereby receive group-common multicast/broadcast transmissions from base station 105-b by determining group-specific configurations for one or more communication parameters. Each group-specific configuration may be associated with a different G-RNTI, and base station 105-b may transmit a multicast/broadcast communication configuration message encoded with the respective G-RNTI to UE 115-d or one or more other UEs 115. Base station 105-b may thereby transmit a group multicast/broadcast downlink transmission to a group of UEs 115 in the same or different cells.

Figure 5:
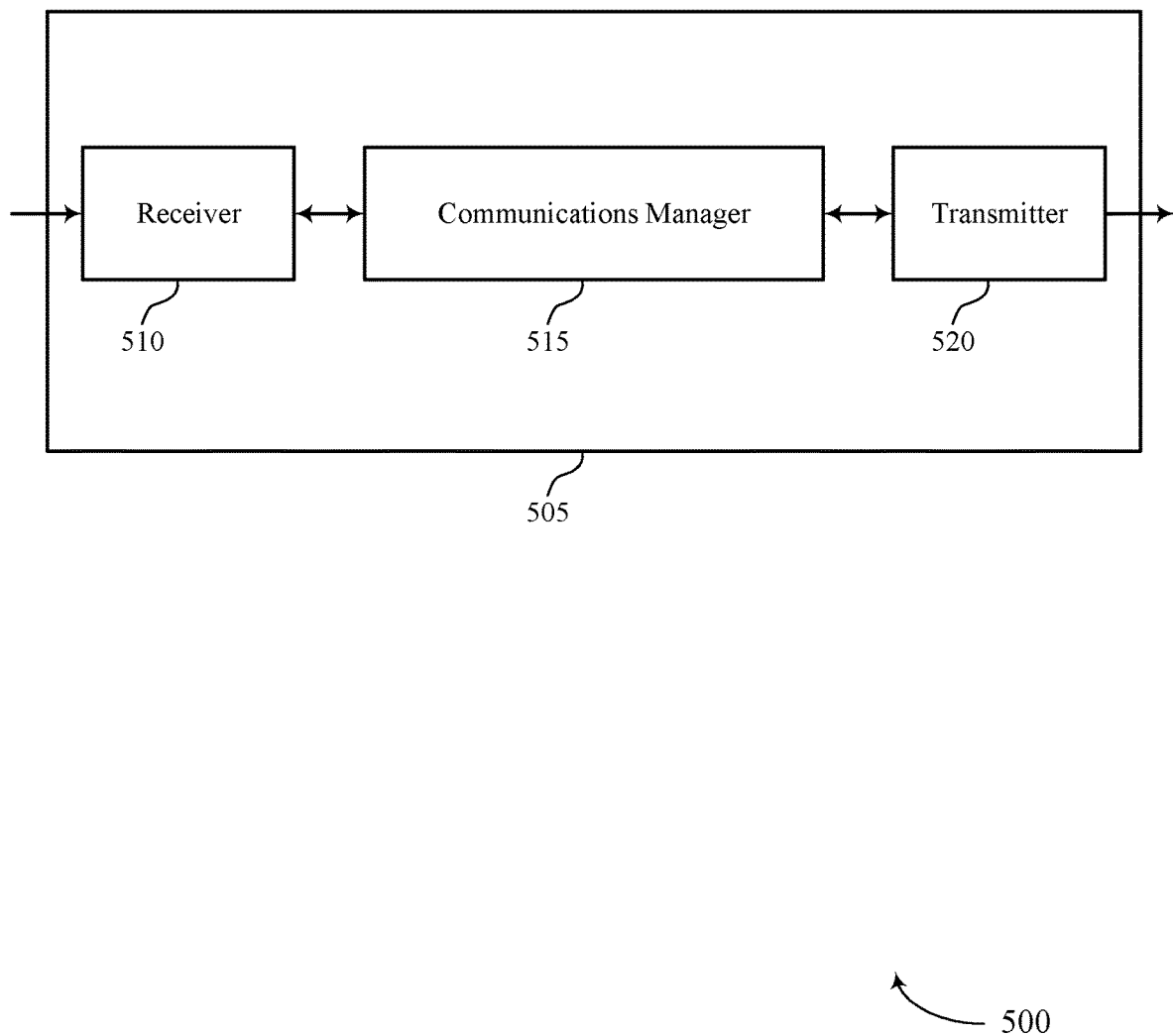
FIGS. 5 and 6 show block diagrams of devices that support downlink shared channel configuration for multicast in accordance with aspects of the present disclosure.

FIG. 5 shows a block diagram 500 of a device 505 that supports downlink shared channel configuration for multicast in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to downlink shared channel configuration for multicast, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a group-specific multicast/broadcast communication configuration for receiving one or more multicast/broadcast downlink signals, where the group-specific multicast/broadcast communication configuration is independently configured from a unicast communication configuration and a cell-specific communication configuration, determine a set of multicast/broadcast communication parameters based on the group-specific multicast/broadcast communication configuration, the set of multicast/broadcast communication parameters including a time resource allocation, a frequency resource allocation, a slot configuration, a downlink reference signal configuration, and a resource mapping configuration for receiving the one or more multicast/broadcast downlink signals, and receive the one or more multicast/broadcast downlink signals based on the set of multicast/broadcast communication parameters including the time resource allocation, the frequency resource allocation, the slot configuration, the downlink reference signal configuration, and the resource mapping configuration. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 described herein may be implemented as a chipset of a wireless modem, and the receiver 510 and the transmitter 520 may be implemented as sets of analog components (e.g., amplifiers, filters, phase shifters, antennas, etc.) The wireless modem may obtain and decode signals from the receiver 510 over a receive interface, and may output signals for transmission to the transmitter 520 over a transmit interface.

The actions performed by the communications manager 515 as described herein may be implemented to realize one or more potential advantages. One implementation may allow a UE 115 to save power and increase battery life by enabling the UE 115 to determine a specific multicast configuration. The UE 115 may identify the configurating based on a combination of signals from a base station 105 and default communication parameters. The default parameters may allow the UE 115 to save power by improving the efficiency with which the UE 115 identifies the configuration. The signaling from the base station 105 may also improve efficiency of the UE 115, thereby saving power and increasing battery life of the UE 115.

Figure 6:
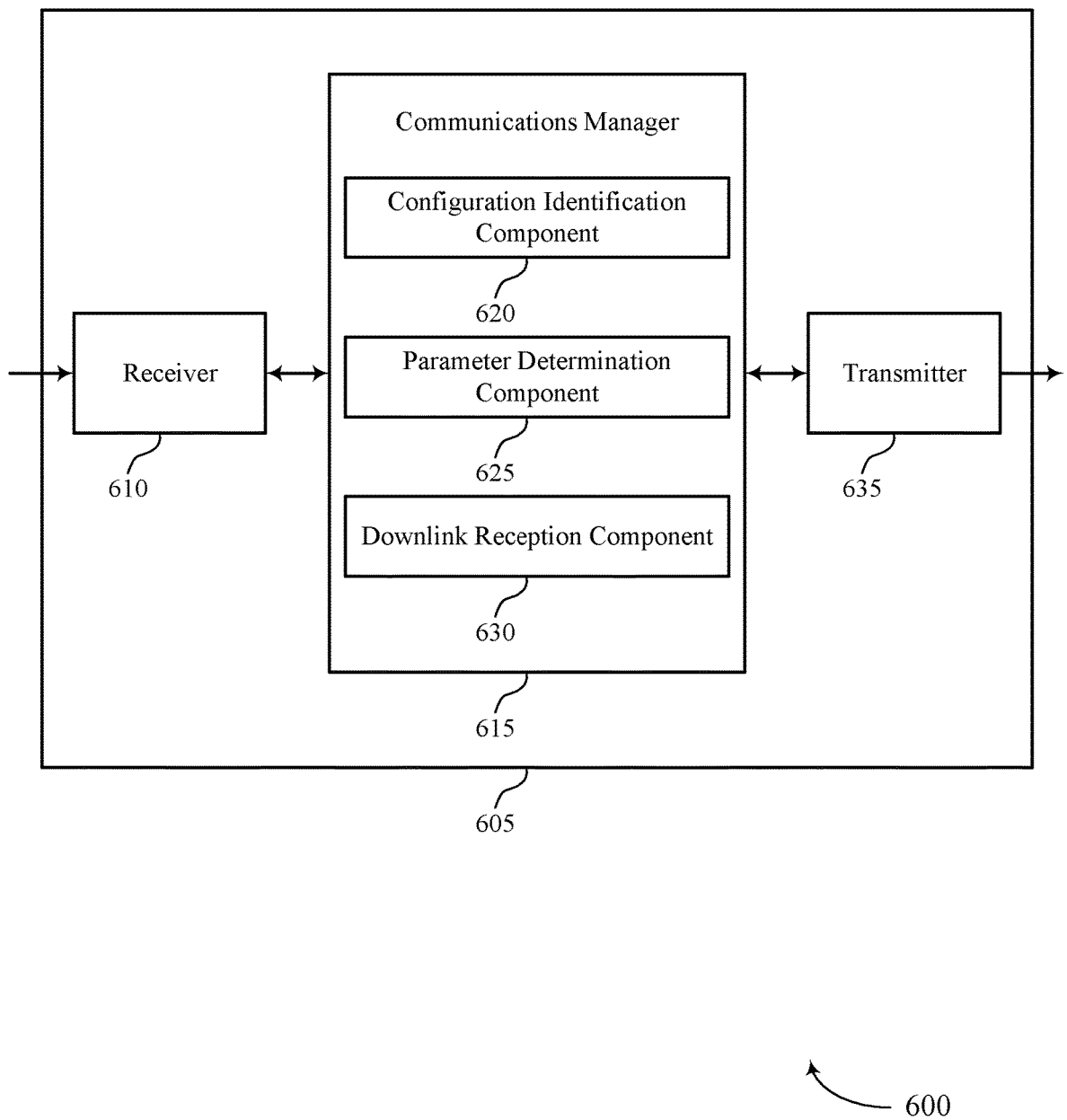

FIG. 6 shows a block diagram 600 of a device 605 that supports downlink shared channel configuration for multicast in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to downlink shared channel configuration for multicast, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a configuration identification component 620, a parameter determination component 625, and a downlink reception component 630. The communications manager 615 may be an example of aspects of the communications manager 810 described herein.

The configuration identification component 620 may identify a group-specific multicast/broadcast communication configuration for receiving one or more multicast/broadcast downlink signals, where the group-specific multicast/broadcast communication configuration is independently configured from a unicast communication configuration and a cell-specific communication configuration.

The parameter determination component 625 may determine a set of multicast/broadcast communication parameters based on the group-specific multicast/broadcast communication configuration, the set of multicast/broadcast communication parameters including a time resource allocation, a frequency resource allocation, a slot configuration, a downlink reference signal configuration, and a resource mapping configuration for receiving the one or more multicast/broadcast downlink signals.

The downlink reception component 630 may receive the one or more multicast/broadcast downlink signals based on the set of multicast/broadcast communication parameters including the time resource allocation, the frequency resource allocation, the slot configuration, the downlink reference signal configuration, and the resource mapping configuration.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

A processor of a UE 115 (e.g., controlling the receiver 610, the transmitter 635, or the transceiver 820 as described with reference to FIG. 8) may operate the components described herein to save power and increase battery life of a UE 115. For example, the processor of the UE 115 may operate components to identify a group-specific multicast/ broadcast communication configuration, and may operate components to determine parameters to the multicast/broadcast communication configuration. The processor of the UE 115 may operate the receiver 610 of the UE 115 to receive multiple multicast/broadcast downlink signals based on the configuration. The determination of the configuration may allow a UE 115 to improve communications reliability by efficiently determining parameters for receiving the downlink signals. In some cases, a processor of the UE 115 may operate the receiver 610 to receive signals from a base station 105 indicating the communication configuration.

Figure 7:
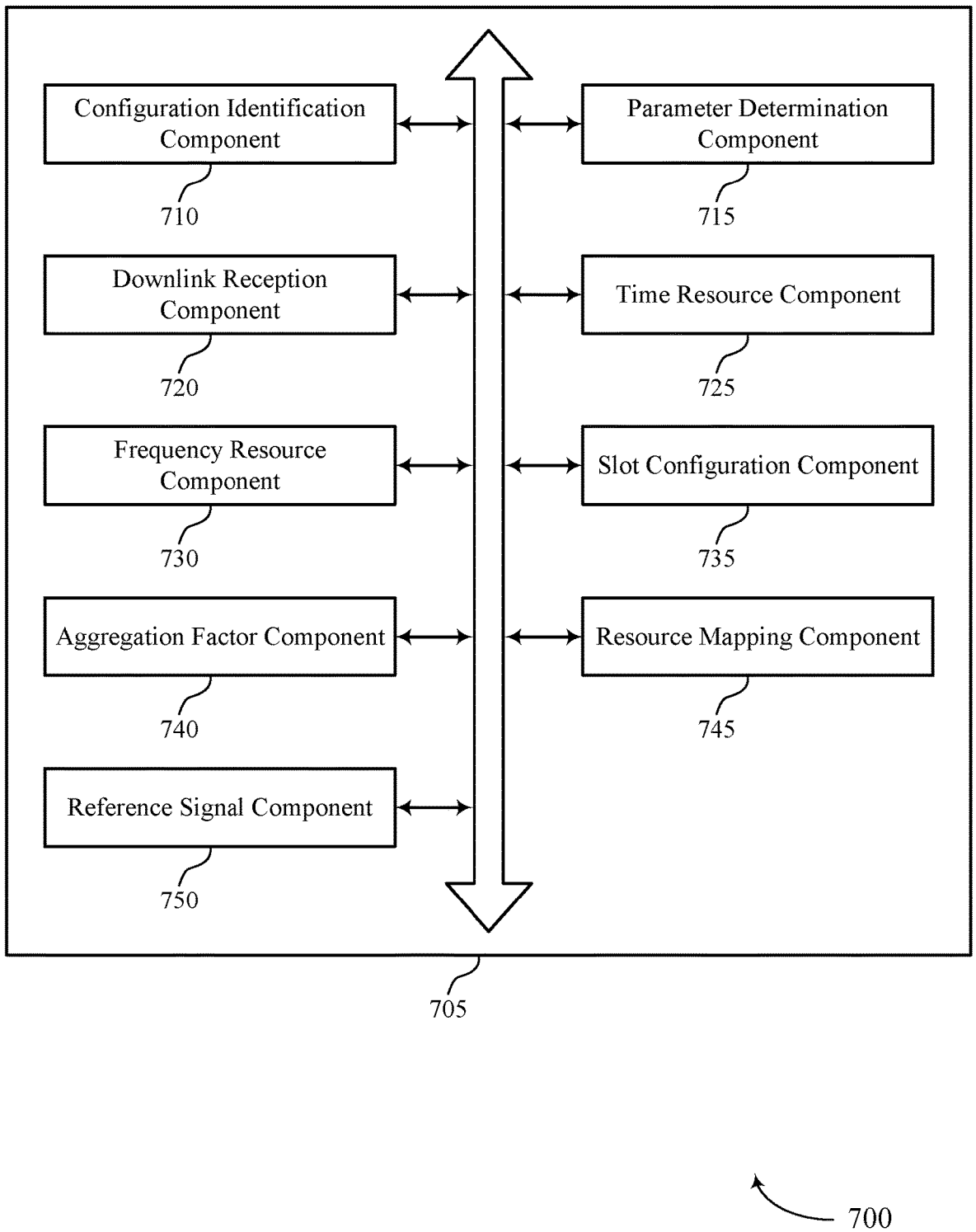
FIG. 7 shows a block diagram of a communications manager that supports downlink shared channel configuration for multicast in accordance with aspects of the present disclosure.

FIG. 7 shows a block diagram 700 of a communications manager 705 that supports downlink shared channel configuration for multicast in accordance with aspects of the present disclosure. The communications manager 705 may be an example of aspects of a communications manager 515, a communications manager 615, or a communications manager 810 described herein. The communications manager 705 may include a configuration identification component 710, a parameter determination component 715, a downlink reception component 720, a time resource component 725, a frequency resource component 730, a slot configuration component 735, an aggregation factor component 740, a resource mapping component 745, and a reference signal component 750. Each of these modules may communicate, directly or indirectly, with one another (e.g., via one or more buses).

The configuration identification component 710 may identify a group-specific multicast/broadcast communication configuration for receiving one or more multicast/broadcast downlink signals, where the group-specific multicast/broadcast communication configuration is independently configured from a unicast communication configuration.

In some examples, the configuration identification component 710 may receive the group-specific multicast/broadcast communication configuration encoded with a G-RNTI, where different G-RNTIs correspond to different group-specific communication configurations.

In some examples, the configuration identification component 710 may receive the group-specific multicast/broadcast communication configuration encoded with a G-RNTI corresponding to a broadcast traffic channel, where the set of multicast communication parameters corresponding to the group-specific multicast/broadcast communication configuration and the G-RNTI is different from parameters associated with an MB-RNTI corresponding to a multicast/broadcast control channel.

The parameter determination component 715 may determine a set of multicast/broadcast communication parameters based on the group-specific multicast/broadcast communication configuration, the set of multicast/broadcast communication parameters including a time resource allocation, a frequency resource allocation, a slot configuration, a downlink reference signal configuration, and a resource mapping configuration for receiving the one or more multicast/broadcast downlink signals.

In some examples, the parameter determination component 715 may identify that a parameter of the set of multicast/broadcast communication parameters is not explicitly identified in the group-specific multicast/broadcast communication configuration.

In some examples, the parameter determination component 715 may determine a default value for the parameter.

In some examples, the parameter determination component 715 may identify that the default value is a corresponding cell-specific value from the cell-specific communication configuration.

In some examples, the parameter determination component 715 may identify that the default value is a corresponding UE-specific value from the UE-specific multicast communication configuration.

In some examples, the parameter determination component 715 may identify that the default value is predefined.

In some examples, the parameter determination component 715 may receive an indication of an RNTI.

In some examples, the parameter determination component 715 may identify that the RNTI is a G-RNTI.

The downlink reception component 720 may receive the one or more multicast/broadcast downlink signals based on the set of multicast/broadcast communication parameters including the time resource allocation, the frequency resource allocation, the slot configuration, the downlink reference signal configuration, and the resource mapping configuration.

The time resource component 725 may determine the time resource allocation via RRC signaling that indicates a G-RNTI, where the G-RNTI is indicated in a time resource allocation table, the time resource allocation table including a set of rows, where each row of the set of rows corresponds to at least one of a slot offset value, a SLIV, and a PDSCH mapping type. In some examples, the time resource component 725 may determine that a default slot offset value is to be used, where the default slot offset value is either 0 or greater than 0.

In some examples, the time resource component 725 may determine that one or more default values of the time resource allocation are to be used. In some examples, the time resource component 725 may determine that a G-RNTI transmission in a common search space is configured. In some examples, the time resource component 725 may receive a DCI signal indicating the subset of rows of the cell-specific allocation table. In some examples, the time resource component 725 may identify the one or more default values of the time resource allocation from the subset of rows of the cell-specific allocation table based on the G-RNTI transmission being configured in the common search space.

In some examples, the time resource component 725 may determine that a G-RNTI transmission in a UE-specific search space is configured. In some examples, the time resource component 725 may receive a DCI signal indicating the subset of rows of the UE-specific allocation table. In some examples, the time resource component 725 may receive a DCI signal indicating the subset of rows of the UE-specific allocation table. In some examples, the time resource component 725 may identify the one or more default values of the time resource allocation from the subset of rows of the UE-specific allocation table based on the G-RNTI transmission being configured in the UE-specific search space.

In some examples, the time resource component 725 may determine that one or more default values of the time resource allocation are to be used. In some examples, the time resource component 725 may identify the one or more default values from a default time resource allocation table.

The frequency resource component 730 may determine the frequency resource allocation via RRC signaling that indicates a group-specific frequency resource allocation type and a group-specific resource block group size.

In some examples, the frequency resource component 730 may determine that one or more default values of the frequency resource allocation are to be used. In some examples, the frequency resource component 730 may identify a default frequency resource allocation type as one of the one or more default values, the default frequency resource allocation type being based on a format of DCI received by the UE.

In some examples, the frequency resource component 730 may identify a default resource block group size as one of the one or more default values, the default resource block group size being based on a G-RNTI.

The slot configuration component 735 may determine the slot configuration via a multicast-specific slot configuration.

In some examples, the slot configuration component 735 may determine that a default slot configuration is to be used. In some examples, the slot configuration component 735 may determine the default slot configuration based on a common TDD uplink-downlink configuration and not based on a dedicated TDD uplink-downlink configuration.

In some examples, the slot configuration component 735 may determine the default slot configuration based on a common TDD uplink-downlink configuration and on a dedicated TDD uplink-downlink configuration.

The aggregation factor component 740 may identify a multicast PDSCH aggregation factor for receiving the one or more multicast/broadcast downlink signals. In some cases, the multicast PDSCH aggregation factor is different from a unicast PDSCH aggregation factor. In some cases, a sequence of redundancy versions for the multicast PDSCH aggregation factor is different from a sequence of redundancy versions for a unicast PDSCH aggregation factor.

The resource mapping component 745 may receive RRC signaling including the resource mapping configuration indicating an interleaver parameter for a virtual resource block configuration to a PRB configuration, where the interleaver parameter is defined based on a G-RNTI different from a unicast RNTI. In some examples, the resource mapping component 745 may determine whether to interleave the virtual resource block configuration with the PRB configuration based on the interleaver parameter.

In some examples, the resource mapping component 745 may determine the resource mapping configuration including a bundling size for a PRB configuration based on the identifying. In some cases, the bundling size is two PRBs.

The reference signal component 750 may identify the downlink reference signal configuration including a default multicast DMRS configuration different from a unicast DMRS configuration, where the default multicast DMRS configuration includes a set of DMRS parameters, and where the set of DMRS parameters include a DMRS type, an additional position parameter, a maximum length parameter, one or more scrambling parameters, a phase tracking parameter, or a combination thereof.

In some examples, the reference signal component 750 may identify the downlink reference signal configuration including the default multicast DMRS configuration based on a time resource allocation table.

In some examples, the reference signal component 750 may receive an indication of an RNTI, identify the RNTI is a G-RNTI, and determine the downlink reference signal configuration including a set of default parameters for a PTRS, where the set of default parameters include a frequency density parameter, a time density parameter, an energy per resource element parameter, a resource element offset parameter, a maximum number of ports parameter, or a combination thereof.

In some examples, the reference signal component 750 may determine a default condition for a presence of the PTRS based on identifying that the RNTI is the G-RNTI, and based on a MCS and a resource block allocation size.

In some examples, the reference signal component 750 may identify that the PTRS is not present in the one or more multicast downlink signals based on a threshold size of the MCS, a threshold of the resource block allocation size, a QPSK configuration, or a combination thereof.

Figure 8:
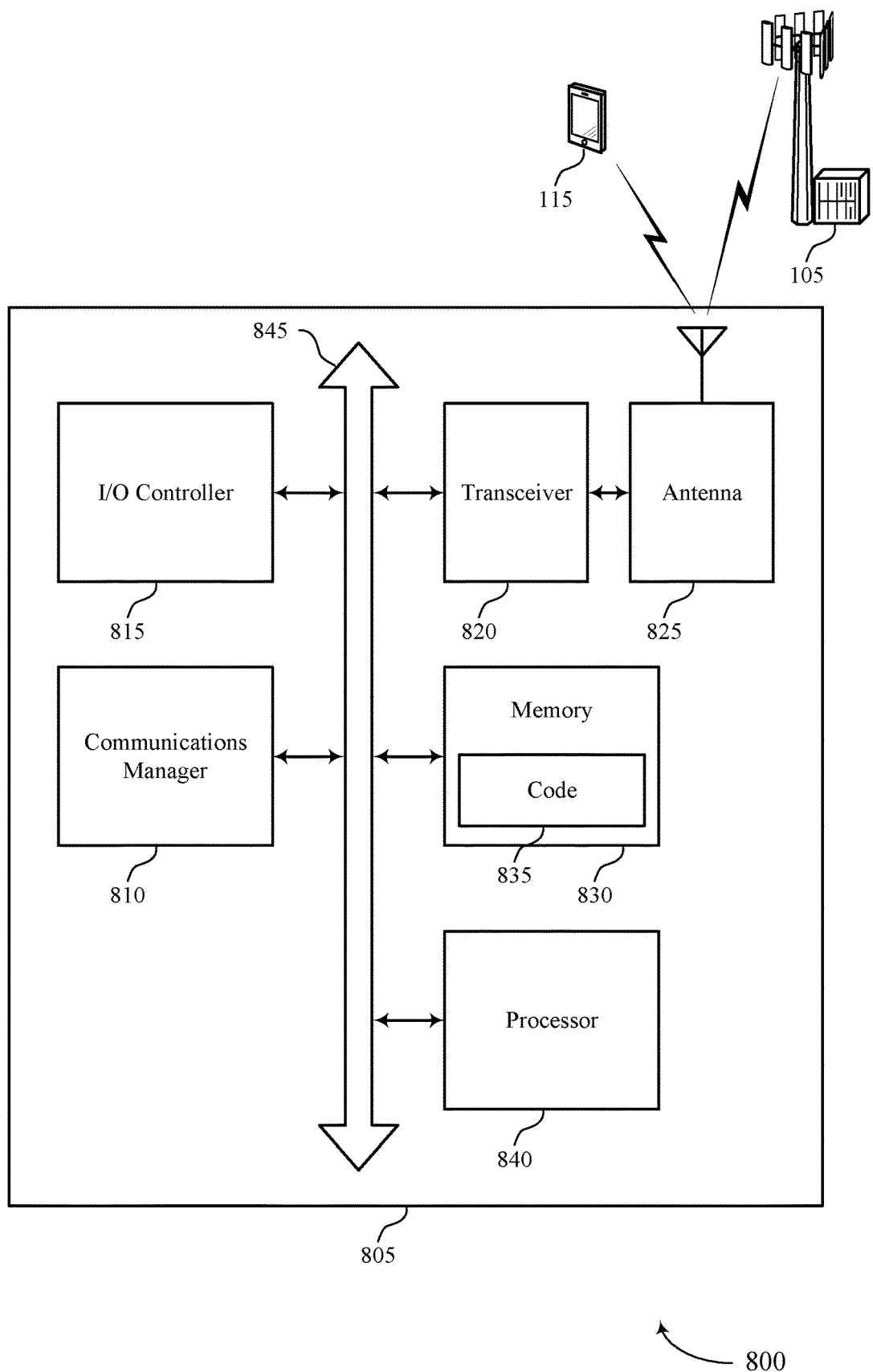
FIG. 8 shows a diagram of a system including a device that supports downlink shared channel configuration for multicast in accordance with aspects of the present disclosure.

FIG. 8 shows a diagram of a system 800 including a device 805 that supports downlink shared channel configuration for multicast in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a group-specific multicast/broadcast communication configuration for receiving one or more multicast/broadcast downlink signals, where the group-specific multicast/broadcast communication configuration is independently configured from a unicast communication configuration and a cell-specific communication configuration, determine a set of multicast/broadcast communication parameters based on the group-specific multicast/broadcast communication configuration, the set of multicast/broadcast communication parameters including a time resource allocation, a frequency resource allocation, a slot configuration, a downlink reference signal configuration, and a resource mapping configuration for receiving the one or more multicast/broadcast downlink signals, and receive the one or more multicast/broadcast downlink signals based on the set of multicast communication parameters including the time resource allocation, the frequency resource allocation, the slot configuration, the downlink reference signal configuration, and the resource mapping configuration.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting downlink shared channel configuration for multicast).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
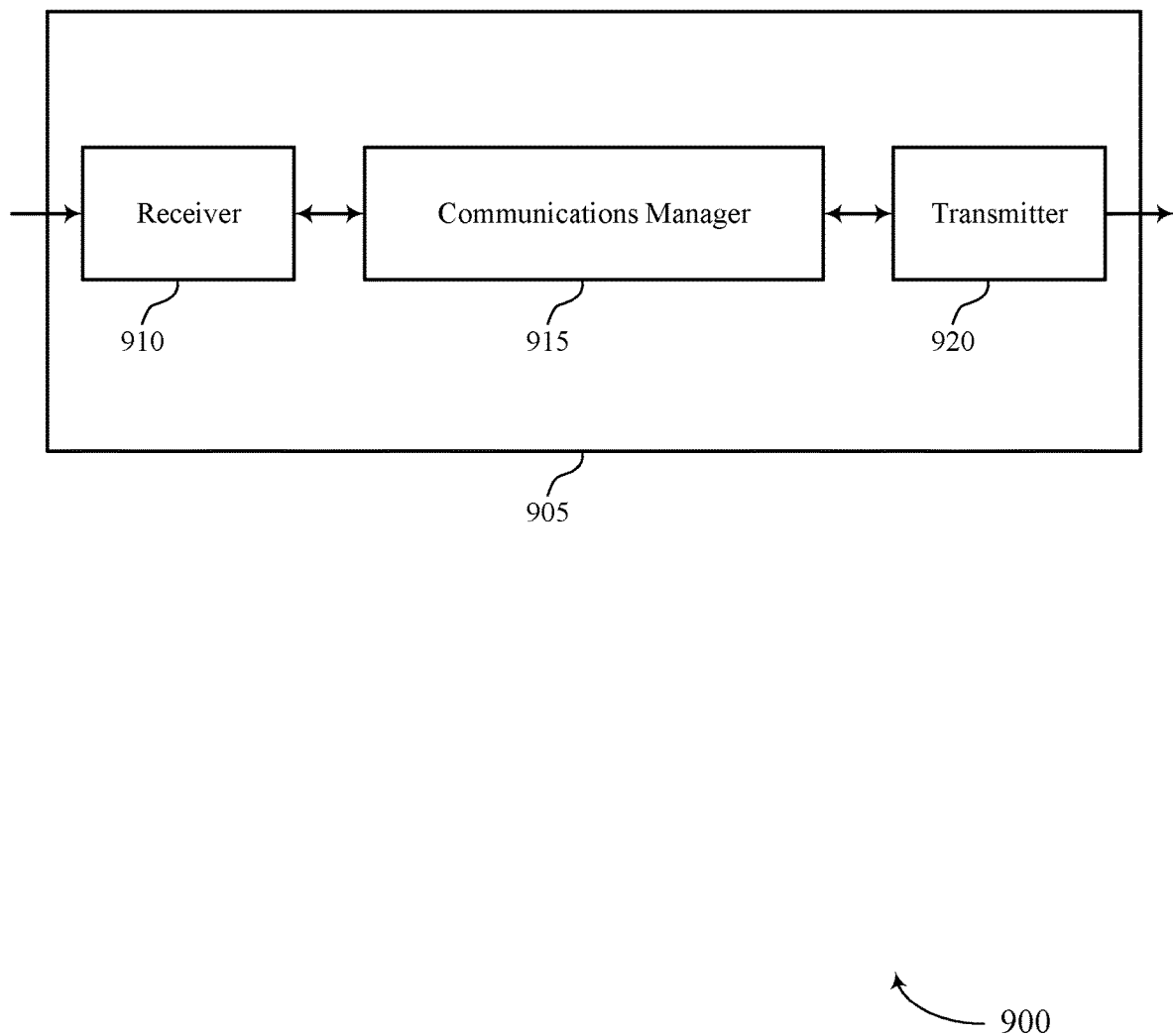
FIGS. 9 and 10 show block diagrams of devices that support downlink shared channel configuration for multicast in accordance with aspects of the present disclosure.

FIG. 9 shows a block diagram 900 of a device 905 that supports downlink shared channel configuration for multicast in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to downlink shared channel configuration for multicast, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a group-specific multicast/broadcast communication configuration for transmitting one or more multicast/broadcast downlink signals, where the group-specific multicast/broadcast communication configuration is independently configured from a unicast communication configuration and a cell-specific communication configuration, determine a set of multicast/broadcast communication parameters based on the group-specific multicast/broadcast communication configuration, the set of multicast/broadcast communication parameters including a time resource allocation, a frequency resource allocation, a slot configuration, a downlink reference signal configuration, and a resource mapping configuration for transmitting the one or more multicast/broadcast downlink signals, and transmit the one or more multicast/broadcast downlink signals based on the set of multicast communication parameters including the time resource allocation, the frequency resource allocation, and the slot configuration. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
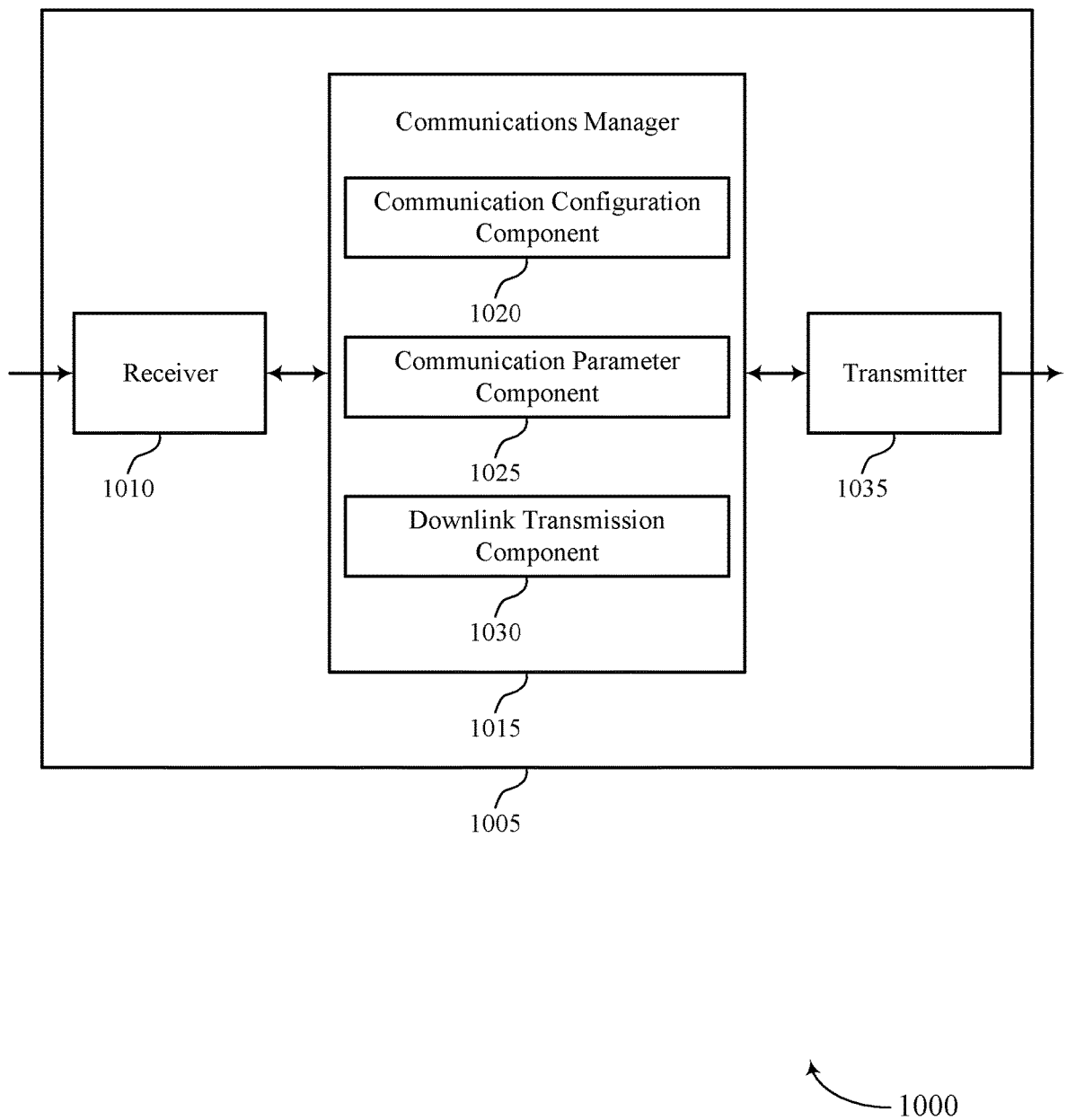

FIG. 10 shows a block diagram 1000 of a device 1005 that supports downlink shared channel configuration for multicast in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to downlink shared channel configuration for multicast, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a communication configuration component 1020, a communication parameter component 1025, and a downlink transmission component 1030. The communications manager 1015 may be an example of aspects of the communications manager 1210 described herein.

The communication configuration component 1020 may identify a group-specific multicast/broadcast communication configuration for transmitting one or more multicast downlink signals, where the group-specific multicast/broadcast communication configuration is independently configured from a unicast communication configuration.

The communication parameter component 1025 may determine a set of multicast communication parameters based on the group-specific multicast/broadcast communication configuration, the set of multicast communication parameters including a time resource allocation, a frequency resource allocation, a slot configuration, a downlink reference signal configuration, and a resource mapping configuration for transmitting the one or more multicast downlink signals.

The downlink transmission component 1030 may transmit the one or more multicast downlink signals based on the set of multicast communication parameters including the time resource allocation, the frequency resource allocation, and the slot configuration.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
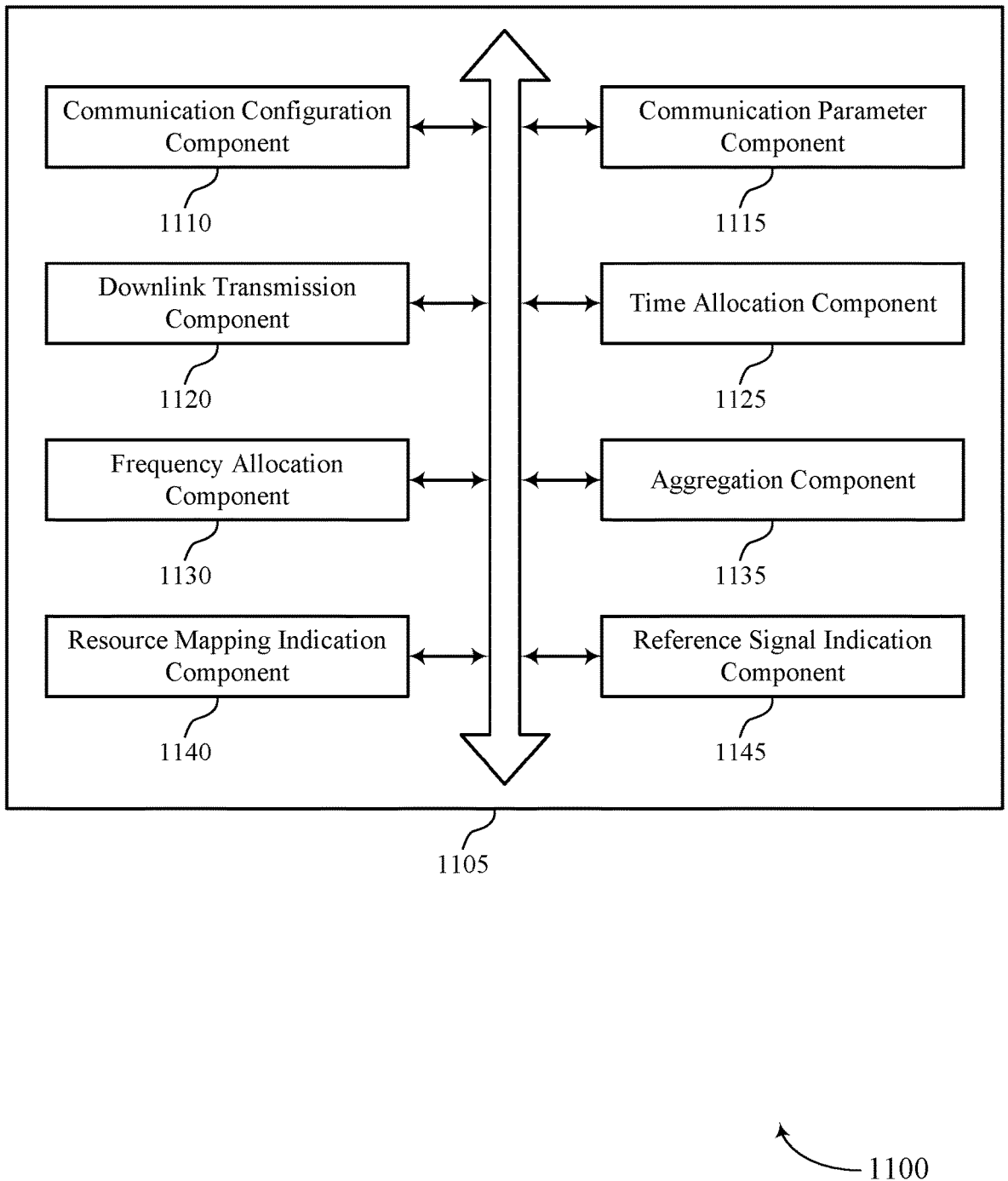
FIG. 11 shows a block diagram of a communications manager that supports downlink shared channel configuration for multicast in accordance with aspects of the present disclosure.

FIG. 11 shows a block diagram 1100 of a communications manager 1105 that supports downlink shared channel configuration for multicast in accordance with aspects of the present disclosure. The communications manager 1105 may be an example of aspects of a communications manager 915, a communications manager 1015, or a communications manager 1210 described herein. The communications manager 1105 may include a communication configuration component 1110, a communication parameter component 1115, a downlink transmission component 1120, a time allocation component 1125, a frequency allocation component 1130, an aggregation component 1135, a resource mapping indication component 1140, and a reference signal indication component 1145. Each of these modules may communicate, directly or indirectly, with one another (e.g., via one or more buses).

The communication configuration component 1110 may identify a group-specific multicast/broadcast communication configuration for transmitting one or more multicast downlink signals, where the group-specific multicast/broadcast communication configuration is independently configured from a unicast communication configuration.

In some examples, the communication configuration component 1110 may transmit the group-specific multicast/broadcast communication configuration encoded with a G-RNTI, where different G-RNTIs correspond to different group-specific communication configurations.

In some examples, the communication configuration component 1110 may transmit the group-specific multicast/broadcast communication configuration encoded with a G-RNTI corresponding to a multicast/broadcast traffic channel, where the set of multicast communication parameters corresponding to the group-specific multicast/broadcast communication configuration and the G-RNTI is different from parameters associated with a multicast/broadcast RNTI corresponding to a multicast/broadcast control channel.

The communication parameter component 1115 may determine a set of multicast communication parameters based on the group-specific multicast/broadcast communication configuration, the set of multicast communication parameters including a time resource allocation, a frequency resource allocation, a slot configuration, a downlink reference signal configuration, and a resource mapping configuration for transmitting the one or more multicast downlink signals.

The downlink transmission component 1120 may transmit the one or more multicast downlink signals based on the set of multicast communication parameters including the time resource allocation, the frequency resource allocation, and the slot configuration.

The time allocation component 1125 may transmit radio resource control signaling that indicates a G-RNTI, where the G-RNTI is indicated in a time resource allocation table, the time resource allocation table including a set of rows, where each row of the set of rows corresponds to at least one of a slot offset value, a start and length indicator value, and a physical downlink shared channel mapping type.

In some examples, the time allocation component 1125 may transmit a downlink control information signal indicating a subset of rows of a cell-specific allocation table, where the cell-specific allocation table is based on a G-RNTI configured in a common search space.

In some examples, the time allocation component 1125 may transmit a downlink control information signal indicating a subset of rows of a UE-specific allocation table, where the UE-specific allocation table is based on a G-RNTI configured in a UE-specific search space.

In some cases, the slot offset value is either 0 or greater than 0.

The frequency allocation component 1130 may transmit radio resource control signaling that indicates a group-specific frequency resource allocation type and a group-specific resource block group size.

The aggregation component 1135 may transmit an indication of a multicast physical downlink shared channel aggregation factor.

In some cases, the multicast physical downlink shared channel aggregation factor is different from a unicast physical downlink shared channel aggregation factor.

In some cases, a sequence of redundancy versions for the multicast physical downlink shared channel aggregation factor is different from a sequence of redundancy versions for a unicast physical downlink shared channel aggregation factor.

The resource mapping indication component 1140 may transmit radio resource control signaling including the resource mapping configuration indicating an interleaver parameter for a virtual resource block configuration to a physical resource block configuration, where the interleaver parameter is defined based on a G-RNTI different from a unicast RNTI.

In some examples, the resource mapping indication component 1140 may transmit an indication of a RNTI.

In some cases, the interleaver parameter indicates whether to interleave the virtual resource block configuration with the physical resource block configuration.

In some cases, the RNTI is a G-RNTI.

The reference signal indication component 1145 may transmit radio resource control signaling including the downlink reference signal configuration that indicates a time resource allocation table, the time resource allocation table indicating a multicast DMRS configuration different from a unicast DMRS configuration, where the multicast DMRS configuration includes a set of DMRS parameters.

In some cases, the set of DMRS parameters include a DMRS type, an additional position parameter, a maximum length parameter, one or more scrambling parameters, a phase tracking parameter, or a combination thereof.

Figure 12:
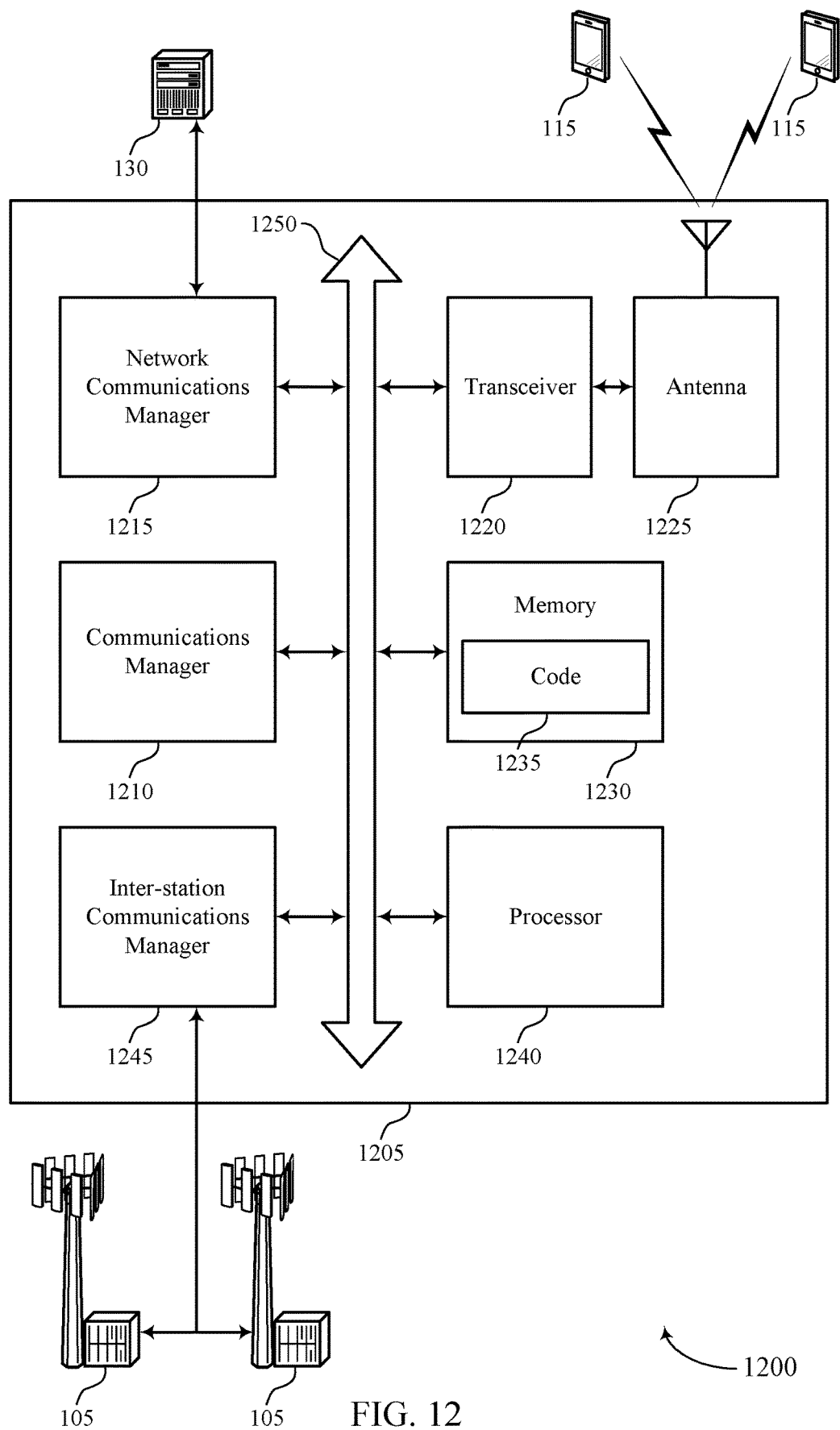
FIG. 12 shows a diagram of a system including a device that supports downlink shared channel configuration for multicast in accordance with aspects of the present disclosure.

FIG. 12 shows a diagram of a system 1200 including a device 1205 that supports downlink shared channel configuration for multicast in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify a group-specific multicast communication configuration for transmitting one or more multicast downlink signals, where the group-specific multicast communication configuration is independently configured from a unicast communication configuration, determine a set of multicast communication parameters based on the group-specific multicast communication configuration, the set of multicast communication parameters including a time resource allocation, a frequency resource allocation, a slot configuration, a downlink reference signal configuration, and a resource mapping configuration for transmitting the one or more multicast downlink signals, and transmit the one or more multicast downlink signals based on the set of multicast communication parameters including the time resource allocation, the frequency resource allocation, and the slot configuration.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting downlink shared channel configuration for multicast).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
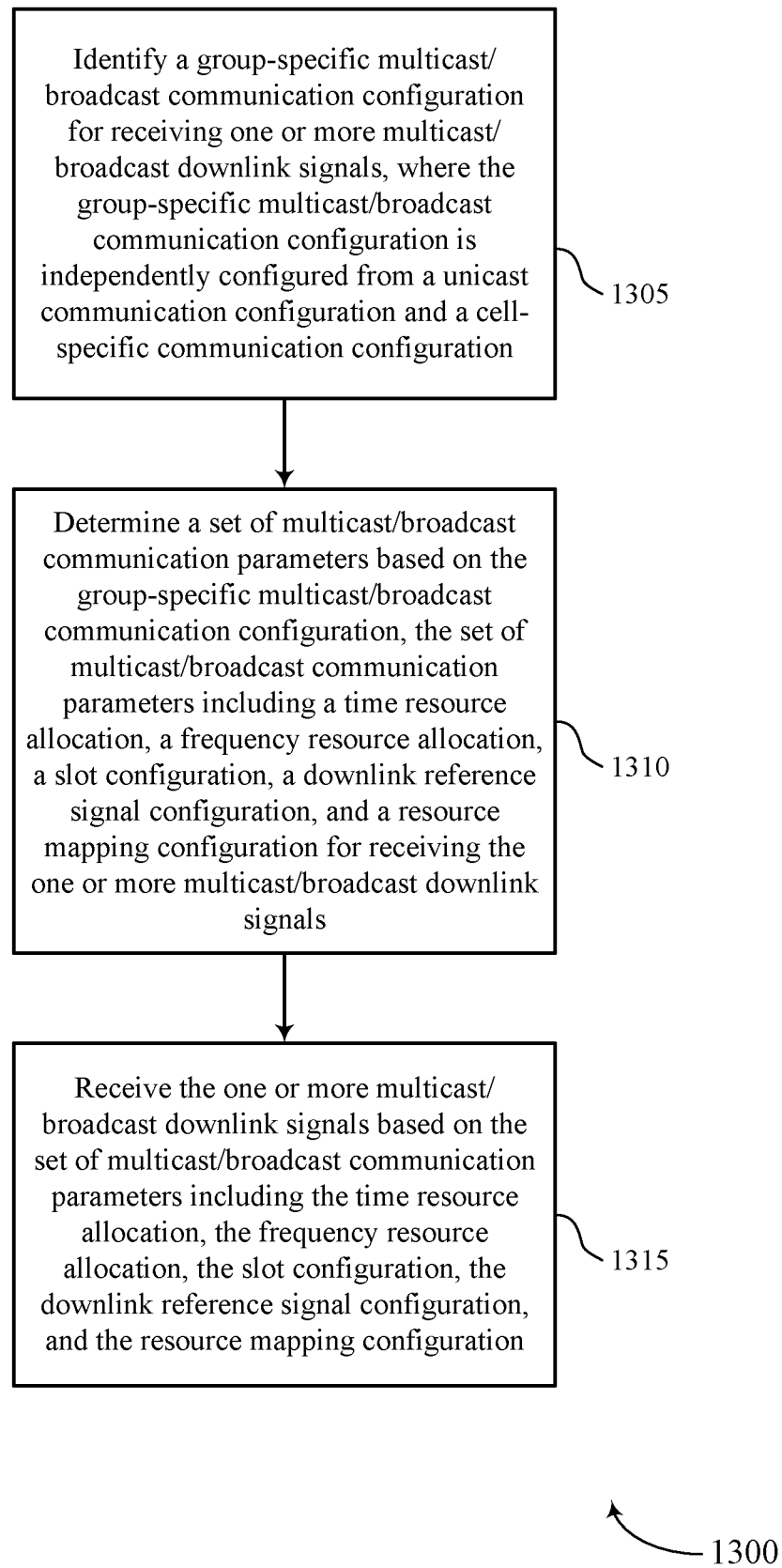
FIGS. 13 through 16 show flowcharts illustrating methods that support downlink shared channel configuration for multicast in accordance with aspects of the present disclosure.

FIG. 13 shows a flowchart illustrating a method 1300 that supports downlink shared channel configuration for multicast in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify a group-specific multicast/broadcast communication configuration for receiving one or more multicast/broadcast downlink signals, where the group-specific multicast/broadcast communication configuration is independently configured from a unicast communication configuration and a cell-specific communication configuration. The operations of 1305 may be performed according to the methods described herein. In some examples, aspects of the operations of 1305 may be performed by a configuration identification component as described with reference to FIGS. 5 through 8.

At 1310, the UE may determine a set of multicast communication parameters based on the group-specific multicast/broadcast communication configuration, the set of multicast/broadcast communication parameters including a time resource allocation, a frequency resource allocation, a slot configuration, a downlink reference signal configuration, and a resource mapping configuration for receiving the one or more multicast/broadcast downlink signals. The operations of 1310 may be performed according to the methods described herein. In some examples, aspects of the operations of 1310 may be performed by a parameter determination component as described with reference to FIGS. 5 through 8.

At 1315, the UE may receive the one or more multicast/broadcast downlink signals based on the set of multicast communication parameters including the time resource allocation, the frequency resource allocation, the slot configuration, the downlink reference signal configuration, and the resource mapping configuration. The operations of 1315 may be performed according to the methods described herein. In some examples, aspects of the operations of 1315 may be performed by a downlink reception component as described with reference to FIGS. 5 through 8.

Figure 14:
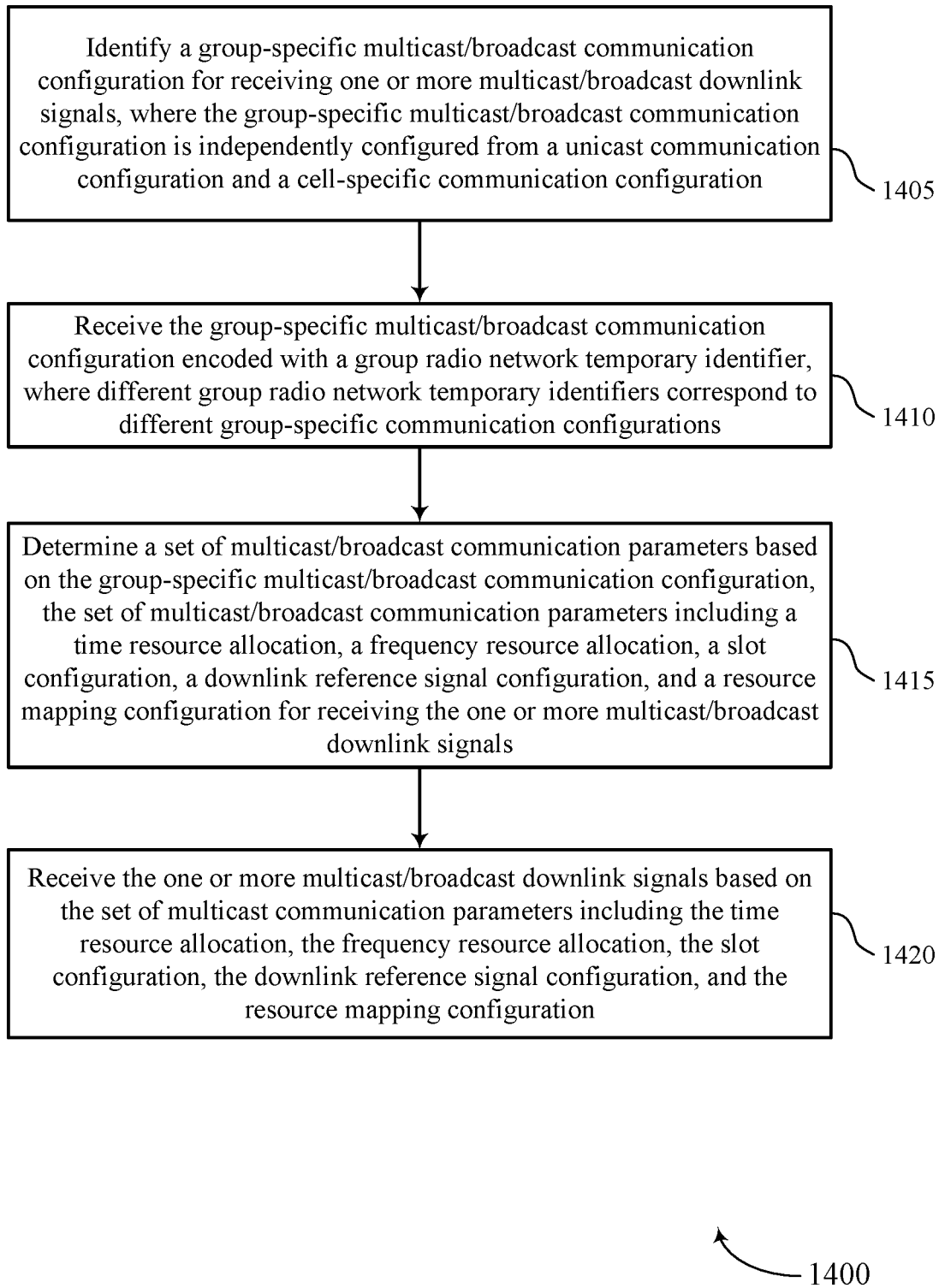

FIG. 14 shows a flowchart illustrating a method 1400 that supports downlink shared channel configuration for multicast in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may identify a group-specific multicast/broadcast communication configuration for receiving one or more multicast/broadcast downlink signals, where the group-specific multicast/broadcast communication configuration is independently configured from a unicast communication configuration and a cell-specific communication configuration. The operations of 1405 may be performed according to the methods described herein. In some examples, aspects of the operations of 1405 may be performed by a configuration identification component as described with reference to FIGS. 5 through 8.

At 1410, the UE may receive the group-specific multicast/broadcast communication configuration encoded with a G-RNTI, where different G-RNTIs correspond to different group-specific communication configurations. The operations of 1410 may be performed according to the methods described herein. In some examples, aspects of the operations of 1410 may be performed by a configuration identification component as described with reference to FIGS. 5 through 8.

At 1415, the UE may determine a set of multicast/broadcast communication parameters based on the group-specific multicast/broadcast communication configuration, the set of multicast/broadcast communication parameters including a time resource allocation, a frequency resource allocation, a slot configuration, a downlink reference signal configuration, and a resource mapping configuration for receiving the one or more multicast/broadcast downlink signals. The operations of 1415 may be performed according to the methods described herein. In some examples, aspects of the operations of 1415 may be performed by a parameter determination component as described with reference to FIGS. 5 through 8.

At 1420, the UE may receive the one or more multicast/broadcast downlink signals based on the set of multicast/broadcast communication parameters including the time resource allocation, the frequency resource allocation, the slot configuration, the downlink reference signal configuration, and the resource mapping configuration. The operations of 1420 may be performed according to the methods described herein. In some examples, aspects of the operations of 1420 may be performed by a downlink reception component as described with reference to FIGS. 5 through 8.

Figure 15:
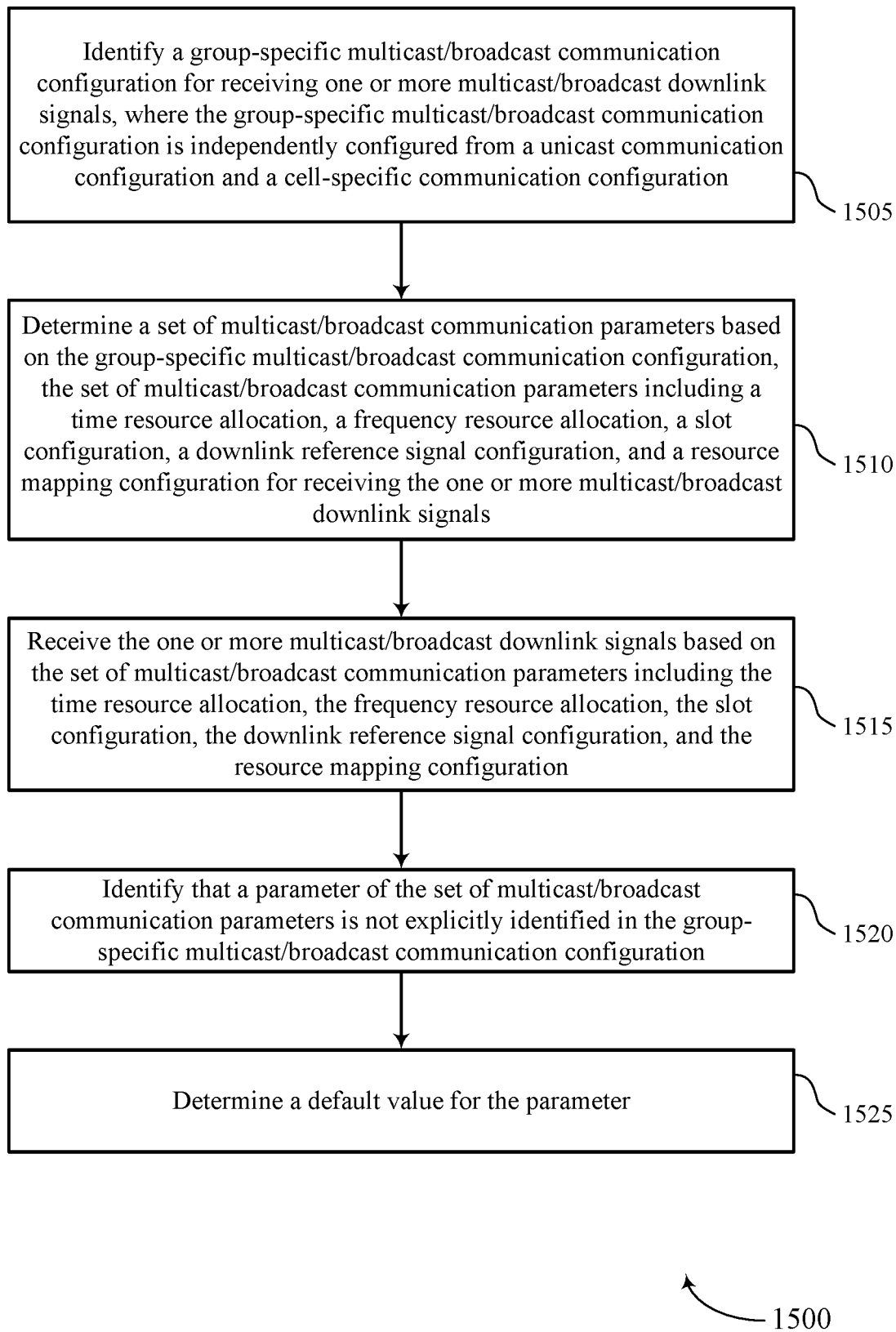

FIG. 15 shows a flowchart illustrating a method 1500 that supports downlink shared channel configuration for multicast in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may identify a group-specific multicast/broadcast communication configuration for receiving one or more multicast downlink signals, where the group-specific multicast/broadcast communication configuration is independently configured from a unicast communication configuration and a cell-specific communication configuration. The operations of 1505 may be performed according to the methods described herein. In some examples, aspects of the operations of 1505 may be performed by a configuration identification component as described with reference to FIGS. 5 through 8.

At 1510, the UE may determine a set of multicast/broadcast communication parameters based on the group-specific multicast/broadcast communication configuration, the set of multicast/broadcast communication parameters including a time resource allocation, a frequency resource allocation, a slot configuration, a downlink reference signal configuration, and a resource mapping configuration for receiving the one or more multicast/broadcast downlink signals. The operations of 1510 may be performed according to the methods described herein. In some examples, aspects of the operations of 1510 may be performed by a parameter determination component as described with reference to FIGS. 5 through 8.

At 1515, the UE may receive the one or more multicast/broadcast downlink signals based on the set of multicast/broadcast communication parameters including the time resource allocation, the frequency resource allocation, the slot configuration, the downlink reference signal configuration, and the resource mapping configuration. The operations of 1515 may be performed according to the methods described herein. In some examples, aspects of the operations of 1515 may be performed by a downlink reception component as described with reference to FIGS. 5 through 8.

At 1520, the UE may identify that a parameter of the set of multicast/broadcast communication parameters is not explicitly identified in the group-specific multicast/broadcast communication configuration. The operations of 1520 may be performed according to the methods described herein. In some examples, aspects of the operations of 1520 may be performed by a parameter determination component as described with reference to FIGS. 5 through 8.

At 1525, the UE may determine a default value for the parameter. The operations of 1525 may be performed according to the methods described herein. In some examples, aspects of the operations of 1525 may be performed by a parameter determination component as described with reference to FIGS. 5 through 8.

Figure 16:
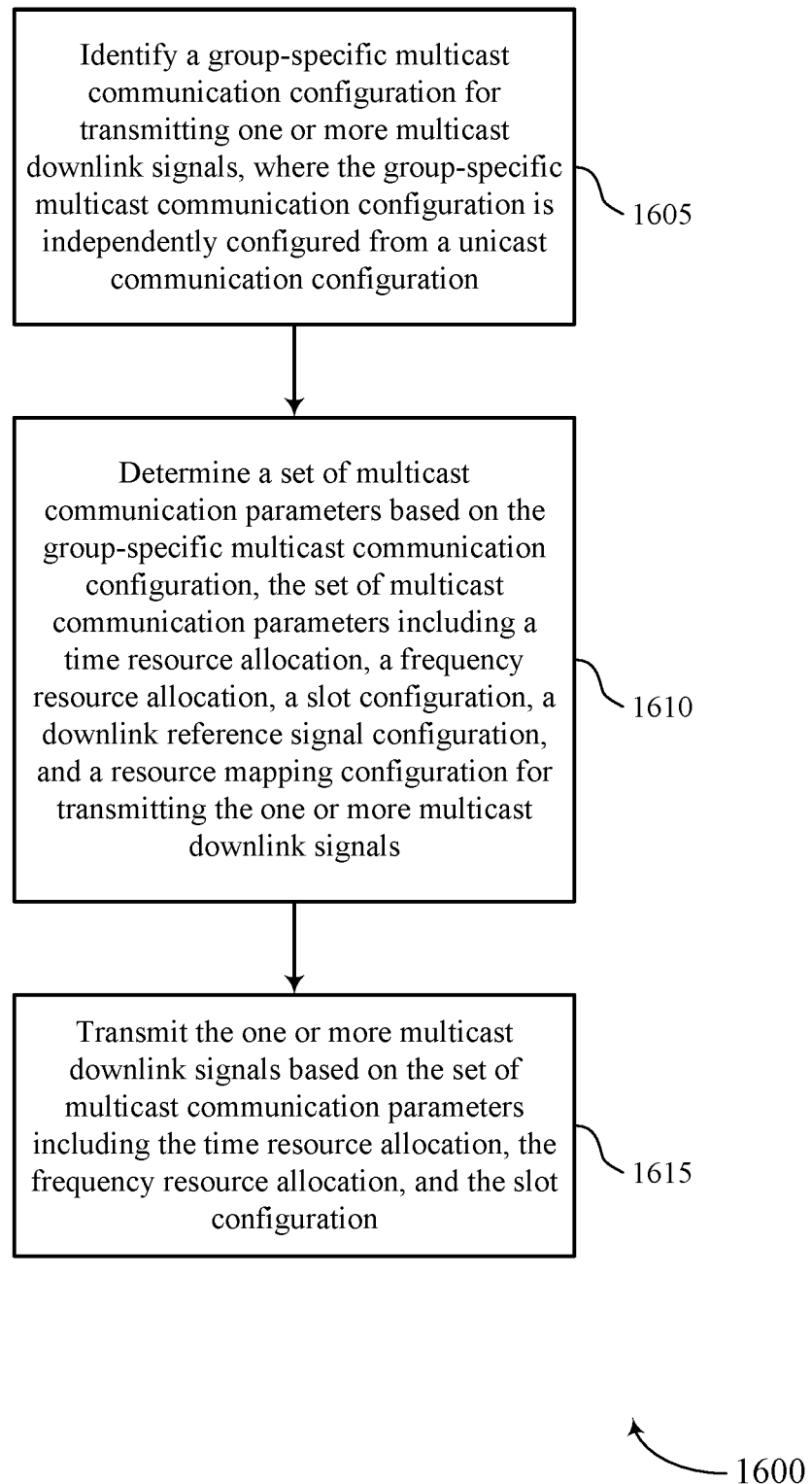

FIG. 16 shows a flowchart illustrating a method 1600 that supports downlink shared channel configuration for multicast in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may identify a group-specific multicast communication configuration for transmitting one or more multicast downlink signals, where the group-specific multicast communication configuration is independently configured from a unicast communication configuration. The operations of 1605 may be performed according to the methods described herein. In some examples, aspects of the operations of 1605 may be performed by a communication configuration component as described with reference to FIGS. 9 through 12.

At 1610, the base station may determine a set of multicast communication parameters based on the group-specific multicast communication configuration, the set of multicast communication parameters including a time resource allocation, a frequency resource allocation, a slot configuration, a downlink reference signal configuration, and a resource mapping configuration for transmitting the one or more multicast downlink signals. The operations of 1610 may be performed according to the methods described herein. In some examples, aspects of the operations of 1610 may be performed by a communication parameter component as described with reference to FIGS. 9 through 12.

At 1615, the base station may transmit the one or more multicast downlink signals based on the set of multicast communication parameters including the time resource allocation, the frequency resource allocation, and the slot configuration. The operations of 1615 may be performed according to the methods described herein. In some examples, aspects of the operations of 1615 may be performed by a downlink transmission component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Aspect 1: A method for wireless communications at a UE, comprising: identifying a group-specific multicast/broadcast communication configuration for receiving one or more multicast/broadcast downlink signals, wherein the group-specific multicast/broadcast communication configuration is independently configured from a unicast communication configuration and a cell-specific communication configuration; determining a plurality of multicast/broadcast communication parameters based at least in part on the group-specific multicast/broadcast communication configuration, the plurality of multicast/broadcast communication parameters including a time resource allocation, a frequency resource allocation, a slot configuration, a downlink reference signal configuration, and a resource mapping configuration for receiving the one or more multicast/broadcast downlink signals; and receiving the one or more multicast/broadcast downlink signals based at least in part on the plurality of multicast/broadcast communication parameters including the time resource allocation, the frequency resource allocation, the slot configuration, the downlink reference signal configuration, and the resource mapping configuration.

Aspect 2: The method of aspect 1, further comprising: receiving the group-specific multicast/broadcast communication configuration encoded with a G-RNTI, wherein different G-RNTIs correspond to different group-specific communication configurations.

Aspect 3: The method of any of aspects 1 or 2, wherein determining the plurality of multicast/broadcast communication parameters comprises: identifying that a parameter of the plurality of multicast/broadcast communication parameters is not explicitly identified in the group-specific multicast/broadcast communication configuration; and determining a default value for the parameter.

Aspect 4: The method of any of aspects 1-3, wherein determining the default value comprises: identifying that the default value is a corresponding cell-specific value from the cell-specific communication configuration.

Aspect 5: The method of any of aspects 1-3, wherein determining the default value comprises: identifying that the default value is a corresponding UE-specific value from a UE-specific multicast/broadcast communication configuration.

Aspect 6: The method of any of aspects 1-3, wherein determining the default value comprises: identifying that the default value is predefined.

Aspect 7: The method of any of aspects 1-6, further comprising: receiving the group-specific multicast/broadcast communication configuration encoded with a G-RNTI corresponding to a broadcast traffic channel, wherein the plurality of multicast/broadcast communication parameters corresponding to the group-specific multicast/broadcast communication configuration and the G-RNTI is different from parameters associated with a multicast/broadcast RNTI corresponding to a multicast/broadcast control channel.

Aspect 8: The method of any of aspects 1-7, wherein determining the plurality of multicast/broadcast communication parameters further comprises: determining the time resource allocation via radio resource control signaling that indicates a G-RNTI, wherein the G-RNTI is indicated in a time resource allocation table, the time resource allocation table comprising a plurality of rows, wherein each row of the plurality of rows corresponds to at least one of a slot offset value, a start and length indicator value, and a physical downlink shared channel mapping type.

Aspect 9: The method of aspect 8, further comprising: determining that a default slot offset value is to be used, wherein the default slot offset value is either 0 or greater than 0.

Aspect 10: The method of any of aspects 1-7, wherein determining the plurality of multicast/broadcast communication parameters further comprises: determining that one or more default values of the time resource allocation are to be used; determining that a G-RNTI transmission in a common search space is configured; receiving a DCI signal indicating a subset of rows of a cell-specific allocation table; and identifying the one or more default values of the time resource allocation from the subset of rows of the cell-specific allocation table based at least in part on the G-RNTI transmission being configured in the common search space.

Aspect 11: The method of any of aspects 1-7, wherein determining the plurality of multicast/broadcast communication parameters further comprises: determining that one or more default values of the time resource allocation are to be used; determining that a G-RNTI transmission in a UE-specific search space is configured; receiving a DCI signal indicating a subset of rows of a UE-specific allocation table; and identifying the one or more default values of the time resource allocation from the subset of rows of the UE-specific allocation table based at least in part on the G-RNTI transmission being configured in the UE-specific search space.

Aspect 12: The method of any of aspects 1-7, wherein determining the plurality of multicast/broadcast communication parameters further comprises: determining that one or more default values of the time resource allocation are to be used; and identifying the one or more default values from a default time resource allocation table.

Aspect 13: The method of any of aspects 1-12, wherein determining the plurality of multicast/broadcast communication parameters further comprises: determining the frequency resource allocation via RRC signaling that indicates a group-specific frequency resource allocation type and a group-specific RBG size.

Aspect 14: The method of any of aspects 1-12, wherein determining the plurality of multicast/broadcast communication parameters further comprises: determining that one or more default values of the frequency resource allocation are to be used; and identifying a default frequency resource allocation type as one of the one or more default values, the default frequency resource allocation type being based at least in part on a format of DCI received by the UE.

Aspect 15: The method of any of aspects 1-12, wherein determining the plurality of multicast/broadcast communication parameters further comprises: determining that one or more default values of the frequency resource allocation are to be used; and identifying a default RBG size as one of the one or more default values, the default RBG size being based at least in part on a G-RNTI.

Aspect 16: The method of any of aspects 1-15, wherein determining the plurality of multicast/broadcast communication parameters further comprises: determining the slot configuration via a multicast-specific slot configuration.

Aspect 17: The method of any of aspects 1-15, wherein determining the plurality of multicast communication parameters further comprises: determining that a default slot configuration is to be used; and determining the default slot configuration based at least in part on a common TDD uplink-downlink configuration and not based on a dedicated TDD uplink-downlink configuration.

Aspect 18: The method of any of aspects 1-15, wherein determining the plurality of multicast communication parameters further comprises: determining that a default slot configuration is to be used; and determining the default slot configuration based at least in part on a common TDD uplink-downlink configuration and on a dedicated TDD uplink-downlink configuration.

Aspect 19: The method of any of aspects 1-18, wherein determining the plurality of multicast/broadcast communication parameters further comprises: identifying a multicast PDSCH aggregation factor for receiving the one or more multicast/broadcast downlink signals.

Aspect 20: The method of aspect 19, wherein the multicast PDSCH aggregation factor is different from a unicast PDSCH aggregation factor.

Aspect 21: The method of aspect 19, wherein a sequence of redundancy versions for the multicast PDSCH aggregation factor is different from a sequence of redundancy versions for a unicast PDSCH aggregation factor.

Aspect 22: The method of any of aspects 1-21, wherein determining the plurality of multicast communication parameters further comprises: receiving RRC signaling comprising the resource mapping configuration indicating an interleaver parameter for a VRB configuration to a DMRS configuration, wherein the interleaver parameter is defined based at least in part on a G-RNTI different from a unicast RNTI; and determining whether to interleave the VRB configuration with the DMRS configuration based at least in part on the interleaver parameter.

Aspect 23: The method of any of aspects 1-22, wherein determining the plurality of multicast/broadcast communication parameters further comprises: identifying the downlink reference signal configuration comprising a default multicast DMRS configuration different from a unicast DMRS configuration, wherein the default multicast DMRS configuration comprises a plurality of DMRS parameters, and wherein the plurality of DMRS parameters comprise a DMRS type, an additional position parameter, a maximum length parameter, one or more scrambling parameters, a phase tracking parameter, or a combination thereof.

Aspect 24: The method of aspect 23, wherein the identifying comprises: identifying the downlink reference signal configuration comprising the default multicast DMRS configuration based at least in part on a time resource allocation table.

Aspect 25: The method of any of aspects 1-24, wherein determining the plurality of multicast communication parameters further comprises: receiving an indication of a RNTI; identifying that the RNTI is a G-RNTI; and determining the downlink reference signal configuration comprising a plurality of default parameters for a PTRS, wherein the plurality of default parameters comprise a frequency density parameter, a time density parameter, an energy per resource element parameter, a resource element offset parameter, a maximum number of ports parameter, or a combination thereof.

Aspect 26: The method of any of aspects 1-25, further comprising: determining a default condition for a presence of the PTRS based at least in part on identifying that the RNTI is the G-RNTI, and based at least in part on a MCS and a RB allocation size.

Aspect 27: The method of any of aspects 1-26, further comprising: identifying that the PTRS is not present in the one or more multicast downlink signals based at least in part on a threshold size of the MCS, a threshold of the RB allocation size, a QPSK configuration, or a combination thereof.

Aspect 28: The method of any of aspects 1-27, wherein determining the plurality of multicast communication parameters further comprises: receiving an indication of a RNTI; identifying that the RNTI is a G-RNTI; and determining the resource mapping configuration comprising a bundling size for a DMRS configuration based at least in part on the identifying.

Aspect 29: The method of any of aspects 1-28, wherein the bundling size is two PRBs.

Aspect 30: A method for wireless communications at a base station, comprising: identifying a group-specific multicast communication configuration for transmitting one or more multicast downlink signals, wherein the group-specific multicast communication configuration is independently configured from a unicast communication configuration; determining a plurality of multicast communication parameters based at least in part on the group-specific multicast communication configuration, the plurality of multicast communication parameters including a time resource allocation, a frequency resource allocation, a slot configuration, a downlink reference signal configuration, and a resource mapping configuration for transmitting the one or more multicast downlink signals; and transmitting the one or more multicast downlink signals based at least in part on the plurality of multicast communication parameters including the time resource allocation, the frequency resource allocation, and the slot configuration.

Aspect 31: The method of aspect 30, further comprising: transmitting the group-specific multicast communication configuration encoded with a G-RNTI, wherein different G-RNTIs correspond to different group-specific communication configurations.

Aspect 32: The method of any of aspects 30 or 31, further comprising: transmitting the group-specific multicast communication configuration encoded with a G-RNTI corresponding to a multicast/broadcast traffic channel, wherein the plurality of multicast communication parameters corresponding to the group-specific multicast communication configuration and the G-RNTI is different from parameters associated with a multicast/broadcast RNTI corresponding to a multicast/broadcast control channel.

Aspect 33: The method of any of aspects 30-32, further comprising: transmitting RRC signaling that indicates a G-RNTI, wherein the G-RNTI is indicated in a time resource allocation table, the time resource allocation table comprising a plurality of rows, wherein each row of the plurality of rows corresponds to at least one of a slot offset value, a SLIV, and a PDSCH mapping type.

Aspect 34: The method of aspect 33, wherein the slot offset value is either 0 or greater than 0.

Aspect 35: The method of any of aspects 30-34, further comprising: transmitting a DCI signal indicating a subset of rows of a cell-specific allocation table, wherein the cell-specific allocation table is based at least in part on a G-RNTI configured in a common search space.

Aspect 36: The method of any of aspects 30-34, further comprising: transmitting a DCI signal indicating a subset of rows of a UE-specific allocation table, wherein the UE-specific allocation table is based at least in part on a G-RNTI configured in a UE-specific search space.

Aspect 37: The method of any of aspects 30-34, further comprising: transmitting RRC signaling that indicates a group-specific frequency resource allocation type and a group-specific RBG size.

Aspect 38: The method of any of aspects 30-37, further comprising: transmitting an indication of a multicast PDSCH aggregation factor.

Aspect 39: The method of aspect 38, wherein the multicast PDSCH aggregation factor is different from a unicast PDSCH aggregation factor.

Aspect 40: The method of aspect 38, wherein a sequence of redundancy versions for the multicast PDSCH aggregation factor is different from a sequence of redundancy versions for a unicast PDSCH aggregation factor.

Aspect 41: The method of any of aspects 30-40, further comprising: transmitting RRC signaling comprising the resource mapping configuration indicating an interleaver parameter for a VRB configuration to a DMRS configuration, wherein the interleaver parameter is defined based at least in part on a G-RNTI different from a unicast RNTI.

Aspect 42: The method of aspects 41, wherein the interleaver parameter indicates whether to interleave the VRB configuration with the DMRS configuration.

Aspect 43: The method of any of aspects 30-42, further comprising: transmitting RRC signaling comprising the downlink reference signal configuration that indicates a time resource allocation table, the time resource allocation table indicating a multicast DMRS configuration different from a unicast DMRS configuration, wherein the multicast DMRS configuration comprises a plurality of DMRS parameters.

Aspect 44: The method of aspect 43, wherein the plurality of DMRS parameters comprise a DMRS type, an additional position parameter, a maximum length parameter, one or more scrambling parameters, a phase tracking parameter, or a combination thereof.

Aspect 45: The method of any of aspects 30-44, further comprising: transmitting an indication of a RNTI.

Aspect 46: The method of aspect 45, wherein the RNTI is a G-RNTI.

Aspect 47: An apparatus comprising at least one means for performing a method of any of aspects 1-29.

Aspect 48: An apparatus comprising at least one means for performing a method of any of aspects 30-46.

Aspect 49: An apparatus for wireless communications comprising a processor; memory couple with the processor, and instructions stored in the memory and executable by the processor to cause the apparatus to perform a method of any of aspects 1-29.

Aspect 50: An apparatus for wireless communications comprising a processor; memory coupled with the processor, and instructions stored in the memory and executable by the processor to cause the apparatus to perform a method of any of aspects 30-46.

Aspect 51: An non-transitory computer-readable medium storing code for wireless communication, the code comprising instructions executable by a processor to perform a method of any of aspects 1-29.

Aspect 52: An non-transitory computer-readable medium storing code for wireless communication, the code comprising instructions executable by a processor to perform a method of any of aspects 34-46.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    identifying a group-specific multicast or broadcast communication configuration for receiving one or more multicast or broadcast downlink signals intended for a group of UEs included in a same multicast or broadcast transmission session, wherein the group-specific multicast or broadcast communication configuration is associated with at least one group radio network temporary identifier that is different from both a unicast radio network temporary identifier and a cell-specific radio network temporary identifier, and wherein the group-specific multicast or broadcast communication configuration is independently configured from a unicast communication configuration and a cell-specific communication configuration;
    determining a plurality of multicast or broadcast communication parameters based at least in part on the group-specific multicast or broadcast communication configuration, the plurality of multicast or broadcast communication parameters including a time resource allocation, a frequency resource allocation, a slot configuration, a downlink reference signal configuration, and a resource mapping configuration for receiving the one or more multicast or broadcast downlink signals, wherein the time resource allocation is determined via a time resource allocation table that includes the at least one group radio network temporary identifier within at least one of one or more rows that each correspond to a different combination of parameters for group-specific multicast or broadcast transmission; and
    receiving the one or more multicast or broadcast downlink signals based at least in part on the plurality of multicast or broadcast communication parameters including the time resource allocation, the frequency resource allocation, the slot configuration, the downlink reference signal configuration, and the resource mapping configuration.

2. The method of claim 1, wherein identifying the group-specific multicast or broadcast communication configuration comprises:
    receiving the group-specific multicast or broadcast communication configuration encoded with the at least one group radio network temporary identifier, wherein different group radio network temporary identifiers correspond to different group-specific communication configurations.

3. The method of claim 1 wherein determining the plurality of multicast or broadcast communication parameters comprises:
    identifying that a parameter of the plurality of multicast or broadcast communication parameters is not explicitly identified in the group-specific multicast or broadcast communication configuration; and
    determining a default value for the parameter.

4. The method of claim 3, wherein determining the default value comprises:
    identifying that the default value is a corresponding cell-specific value from the cell-specific communication configuration.

5. The method of claim 3, wherein determining the default value comprises:
    identifying that the default value is a corresponding UE-specific value from a UE-specific multicast or broadcast communication configuration.

6. The method of claim 3, wherein determining the default value comprises:
    identifying that the default value is predefined.

7. The method of claim 1, further comprising:
    receiving the group-specific multicast/broadcast communication configuration encoded with a group radio network temporary identifier corresponding to a broadcast traffic channel, wherein the plurality of multicast/broadcast communication parameters corresponding to the group-specific multicast/broadcast communication configuration and the group radio network temporary identifier is different from parameters associated with a multicast/broadcast radio network temporary identifier corresponding to a multicast/broadcast control channel.

8. The method of claim 1, wherein determining the plurality of multicast/broadcast communication parameters further comprises:
    determining the time resource allocation via radio resource control signaling that indicates a group radio network temporary identifier, wherein the group radio network temporary identifier is indicated in a time resource allocation table, the time resource allocation table comprising a plurality of rows, wherein each row of the plurality of rows corresponds to at least one of a slot offset value, a start and length indicator value, and a physical downlink shared channel mapping type.

9. The method of claim 8, further comprising:
    determining that a default slot offset value is to be used, wherein the default slot offset value is either 0 or greater than 0.

10. The method of claim 1, wherein determining the plurality of multicast/broadcast communication parameters further comprises:
    determining that one or more default values of the time resource allocation are to be used;
    determining that a group radio network temporary identifier transmission in a common search space is configured;
    receiving a downlink control information signal indicating a subset of rows of a cell-specific allocation table; and
    identifying the one or more default values of the time resource allocation from the subset of rows of the cell-specific allocation table based at least in part on the group radio network temporary identifier transmission being configured in the common search space.

11. The method of claim 1, wherein determining the plurality of multicast/broadcast communication parameters further comprises:
    determining that one or more default values of the time resource allocation are to be used;
    determining that a group radio network temporary identifier transmission in a UE-specific search space is configured;
    receiving a downlink control information signal indicating a subset of rows of a UE-specific allocation table; and
    identifying the one or more default values of the time resource allocation from the subset of rows of the UE-specific allocation table based at least in part on the group radio network temporary identifier transmission being configured in the UE-specific search space.

12. The method of claim 1, wherein determining the plurality of multicast/broadcast communication parameters further comprises:
    determining that one or more default values of the time resource allocation are to be used; and
    identifying the one or more default values from a default time resource allocation table.

13. The method of claim 1, wherein determining the plurality of multicast/broadcast communication parameters further comprises:
    determining the frequency resource allocation via radio resource control signaling that indicates a group-specific frequency resource allocation type and a group-specific resource block group size.

14. The method of claim 1, wherein determining the plurality of multicast/broadcast communication parameters further comprises:
    determining that one or more default values of the frequency resource allocation are to be used; and
    identifying a default frequency resource allocation type as one of the one or more default values, the default frequency resource allocation type being based at least in part on a format of downlink control information received by the UE.

15. The method of claim 1, wherein determining the plurality of multicast/broadcast communication parameters further comprises:
    determining that one or more default values of the frequency resource allocation are to be used; and
    identifying a default resource block group size as one of the one or more default values, the default resource block group size being based at least in part on a group radio network temporary identifier.

16. The method of claim 1, wherein determining the plurality of multicast/broadcast communication parameters further comprises:
    determining the slot configuration via a multicast-specific slot configuration.

17. The method of claim 1, wherein determining the plurality of multicast/broadcast communication parameters further comprises:
    determining that a default slot configuration is to be used; and
    determining the default slot configuration based at least in part on a common time division duplex uplink-downlink configuration and not based on a dedicated time division duplex uplink-downlink configuration.

18. The method of claim 1, wherein determining the plurality of multicast/broadcast communication parameters further comprises:
    determining that a default slot configuration is to be used; and
    determining the default slot configuration based at least in part on a common time division duplex uplink-downlink configuration and on a dedicated time division duplex uplink-downlink configuration.

19. The method of claim 1, wherein determining the plurality of multicast/broadcast communication parameters further comprises:
    identifying a multicast physical downlink shared channel aggregation factor for receiving the one or more multicast/broadcast downlink signals.

20. The method of claim 1, wherein determining the plurality of multicast/broadcast communication parameters further comprises:
receiving radio resource control signaling comprising the resource mapping configuration indicating an interleaver parameter for a virtual resource block configuration to a physical resource block configuration, wherein the interleaver parameter is defined based at least in part on a group radio network temporary identifier different from a unicast radio network temporary identifier; and
determining whether to interleave the virtual resource block configuration with the physical resource block configuration based at least in part on the interleaver parameter.

21. The method of claim 1, wherein determining the plurality of multicast/broadcast communication parameters further comprises:
identifying the downlink reference signal configuration comprising a default multicast/broadcast demodulation reference signal configuration different from a unicast demodulation reference signal configuration, wherein the default multicast/broadcast demodulation reference signal configuration comprises a plurality of demodulation reference signal parameters, wherein the plurality of demodulation reference signal parameters comprise a demodulation reference signal type, an additional position parameter, a maximum length parameter, one or more scrambling parameters, a phase tracking parameter, or a combination thereof.

22. The method of claim 21, wherein the identifying comprises:
identifying the downlink reference signal configuration comprising the default multicast/broadcast demodulation reference signal configuration based at least in part on a time resource allocation table.

23. The method of claim 1, wherein determining the plurality of multicast/broadcast communication parameters further comprises:
receiving an indication of a radio network temporary identifier;
identifying that the radio network temporary identifier is a group radio network temporary identifier; and
determining the downlink reference signal configuration comprising a plurality of default parameters for a phase tracking reference signal, wherein the plurality of default parameters comprise a frequency density parameter, a time density parameter, an energy per resource element parameter, a resource element offset parameter, a maximum number of ports parameter, or a combination thereof.

24. The method of claim 23, further comprising:
determining a default condition for a presence of the phase tracking reference signal based at least in part on identifying that the radio network temporary identifier is the group radio network temporary identifier, and based at least in part on a modulation and coding scheme and a resource block allocation size.

25. The method of claim 24, further comprising:
identifying that the phase tracking reference signal is not present in the one or more multicast/broadcast downlink signals based at least in part on a threshold size of the modulation and coding scheme, a threshold of a resource block allocation size, a quadrature phase shift keying configuration, or a combination thereof.

26. The method of claim 1, wherein determining the plurality of multicast/broadcast communication parameters further comprises:
receiving an indication of a radio network temporary identifier;
identifying that the radio network temporary identifier is a group radio network temporary identifier; and
determining the resource mapping configuration comprising a bundling size for a physical resource block configuration based at least in part on the identifying.

27. An apparatus for wireless communications, comprising:
a processor; and
a memory coupled with the processor, with instructions stored in the memory, the instructions being executable by the processor to cause the apparatus to:
identify a group-specific multicast or broadcast communication configuration for receiving one or more multicast or broadcast downlink signals intended for a group of UEs included in a same multicast or broadcast transmission session, wherein the group-specific multicast or broadcast communication configuration is associated with at least one group radio network temporary identifier that is different from both a unicast radio network temporary identifier and a cell-specific radio network temporary identifier, and wherein the group-specific multicast or broadcast communication configuration is independently configured from a unicast communication configuration and a cell-specific communication configuration;
determine a plurality of multicast or broadcast communication parameters based at least in part on the group-specific multicast or broadcast communication configuration, the plurality of multicast or broadcast communication parameters including a time resource allocation, a frequency resource allocation, a slot configuration, a downlink reference signal configuration, and a resource mapping configuration for receiving the one or more multicast or broadcast downlink signals, wherein the time resource allocation is determined via a time resource allocation table that includes the at least one group radio network temporary identifier within at least one of one or more rows that each correspond to a different combination of parameters for group-specific multicast or broadcast transmission; and
receive the one or more multicast or broadcast downlink signals based at least in part on the plurality of multicast or broadcast communication parameters including the time resource allocation, the frequency resource allocation, the slot configuration, the downlink reference signal configuration, and the resource mapping configuration.

28. The apparatus of claim 27, wherein the instructions to identify the group-specific multicast or broadcast communication configuration are executable by the processor to cause the apparatus to:
receive the group-specific multicast or broadcast communication configuration encoded with the at least one group radio network temporary identifier, wherein different group radio network temporary identifiers correspond to different group-specific communication configurations.

29. The apparatus of claim 27, wherein the instructions to determine the plurality of multicast or broadcast communication parameters are executable by the processor to cause the apparatus to:
  identify that a parameter of the plurality of multicast or broadcast communication parameters is not explicitly identified in the group-specific multicast or broadcast communication configuration; and
  determine a default value for the parameter.

30. The apparatus of claim 29, wherein the instructions to determine the default value are executable by the processor to cause the apparatus to:
  identify that the default value is a corresponding cell-specific value from the cell-specific communication configuration.

31. The apparatus of claim 29, wherein the instructions to determine the default value are executable by the processor to cause the apparatus to:
  identify that the default value is a corresponding UE-specific value from a UE-specific multicast or broadcast communication configuration.

32. The apparatus of claim 29, wherein the instructions to determine the default value are executable by the processor to cause the apparatus to:
  identify that the default value is predefined.

33. A non-transitory computer-readable medium storing code for wireless communications at a user equipment (UE), the code comprising instructions executable by a processor to:
  identify a group-specific multicast or broadcast communication configuration for receiving one or more multicast or broadcast downlink signals intended for a group of UEs included in a same multicast or broadcast transmission session, wherein the group-specific multicast or broadcast communication configuration is associated with at least one group radio network temporary identifier that is different from both a unicast radio network temporary identifier and a cell-specific radio network temporary identifier, and wherein the group-specific multicast or broadcast communication configuration is independently configured from a unicast communication configuration and a cell-specific communication configuration;
  determine a plurality of multicast or broadcast communication parameters based at least in part on the group-specific multicast or broadcast communication configuration, the plurality of multicast or broadcast communication parameters including a time resource allocation, a frequency resource allocation, a slot configuration, a downlink reference signal configuration, and a resource mapping configuration for receiving the one or more multicast or broadcast downlink signals, wherein the time resource allocation is determined via a time resource allocation table that includes the at least one group radio network temporary identifier within at least one of one or more rows that each correspond to a different combination of parameters for group-specific multicast or broadcast transmission; and
  receive the one or more multicast or broadcast downlink signals based at least in part on the plurality of multicast or broadcast communication parameters including the time resource allocation, the frequency resource allocation, the slot configuration, the downlink reference signal configuration, and the resource mapping configuration.

34. The non-transitory computer-readable medium of claim 33, wherein the instructions to identify the group-specific multicast or broadcast communication configuration are executable by the processor to:
  receive the group-specific multicast or broadcast communication configuration encoded with the at least one group radio network temporary identifier, wherein different group radio network temporary identifiers correspond to different group-specific communication configurations.

35. The non-transitory computer-readable medium of claim 33, wherein the instructions to determine the plurality of multicast or broadcast communication parameters are executable by the processor to:
  identify that a parameter of the plurality of multicast or broadcast communication parameters is not explicitly identified in the group-specific multicast or broadcast communication configuration; and
  determine a default value for the parameter.

36. The non-transitory computer-readable medium of claim 35, wherein the instructions to determining the default value are executable by the processor to:
  identify that the default value is a corresponding cell-specific value from the cell-specific communication configuration.

37. The non-transitory computer-readable medium of claim 35, wherein the instructions to determining the default value are executable by the processor to:
  identify that the default value is a corresponding UE-specific value from a UE-specific multicast or broadcast communication configuration.

38. The non-transitory computer-readable medium of claim 35, wherein the instructions to determining the default value are executable by the processor to:
  identify that the default value is predefined.

* * * * *